United States Patent
Ohtake

(10) Patent No.: US 7,116,489 B2
(45) Date of Patent: Oct. 3, 2006

(54) ZOOM LENS AND IMAGING DEVICE

(75) Inventor: Motoyuki Ohtake, Saitama (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/234,233

(22) Filed: Sep. 26, 2005

(65) Prior Publication Data
US 2006/0066952 A1    Mar. 30, 2006

(30) Foreign Application Priority Data
Sep. 30, 2004   (JP)   ............... 2004-287438

(51) Int. Cl.
*G02B 15/14*   (2006.01)
(52) U.S. Cl. .............. 359/687; 359/683; 359/714; 359/740; 359/757; 359/764; 359/557
(58) Field of Classification Search ............ 359/676, 359/683, 687, 714, 740, 757, 764, 557
See application file for complete search history.

(56) References Cited

U.S. PATENT DOCUMENTS

| | | | | |
|---|---|---|---|---|
| 4,094,586 A | * | 6/1978 | Sato et al. | 359/683 |
| 4,934,796 A | * | 6/1990 | Sugiura et al. | 359/683 |
| 5,136,430 A | * | 8/1992 | Hamanishi | 359/676 |
| 5,388,004 A | * | 2/1995 | Adachi | 359/683 |
| 5,579,171 A | * | 11/1996 | Suzuki et al. | 359/687 |
| 5,771,123 A | | 6/1998 | Hamano | |
| 5,818,646 A | * | 10/1998 | Hamano | 359/684 |
| 5,917,658 A | * | 6/1999 | Yamanashi | 359/676 |
| 5,933,281 A | * | 8/1999 | Suzuki | 359/676 |
| 6,025,962 A | * | 2/2000 | Suzuki | 359/557 |
| 6,094,312 A | * | 7/2000 | Nakayama | 359/676 |
| 6,104,546 A | * | 8/2000 | Yoshikawa | 359/674 |
| 6,285,501 B1 | * | 9/2001 | Suzuki | 359/557 |
| 6,754,446 B1 | * | 6/2004 | Hagimori et al. | 359/676 |
| 6,825,989 B1 | * | 11/2004 | Uzawa et al. | 359/684 |

(Continued)

FOREIGN PATENT DOCUMENTS

EP    11044845    2/1999

(Continued)

OTHER PUBLICATIONS

European Search Report, Dated Feb. 16, 2006.

*Primary Examiner*—Evelyn A. Lester
(74) *Attorney, Agent, or Firm*—Rader, Fishman, & Grauer PLLC; Ronald P. Kananen

(57) ABSTRACT

Disclosed are a zoom lens and an imaging device. The zoom lens has a first lens group with positive refractive power, a second lens group with negative refractive power, a third lens group with positive refractive power, a fourth lens group with positive refractive power, and a fifth lens group including a negative subgroup with negative refractive power and a positive subgroup and with positive refractive power. An aperture stop is disposed in the vicinity of the third lens group. The lens surface of the negative subgroup of the fifth lens group on the image side and nearest to the image is concave, and the lens surface of the positive subgroup of the fifth lens group on the object side and nearest to the object is convex. The positive subgroup shifts in a direction approximately perpendicular to the optical axis to shift an image. The zoom lens satisfies the condition defined by the inequality (1) below:

$$0.2 < f_{5p}/f_t < 0.5$$

where $f_{5p}$ denotes the focal length of the positive subgroup of the fifth lens group, and $f_t$ denotes the focal length of the entire lens system in the telephoto end state.

32 Claims, 23 Drawing Sheets

U.S. PATENT DOCUMENTS

| | | |
|---|---|---|
| 6,999,240 B1 * | 2/2006 | Yamada et al. ............. 359/683 |
| 2002/0024732 A1 * | 2/2002 | Hamano et al. ............ 359/557 |
| 2003/0175021 A1 * | 9/2003 | Hamano ...................... 396/72 |
| 2004/0233302 A1 * | 11/2004 | Kojima .................... 348/240.3 |

FOREIGN PATENT DOCUMENTS

| | | | |
|---|---|---|---|
| EP | 2004212611 | 7/2004 | |
| JP | 01-055511 A * | 3/1989 | ................. 359/684 |
| JP | 01-284818 A * | 11/1989 | ................. 359/676 |
| JP | 2002-244037 | 8/2002 | |
| JP | 2003-228001 | 8/2003 | |
| JP | 2003-295057 | 10/2003 | |
| WO | WO-03/071332 A1 | 8/2003 | |

\* cited by examiner

COMA ABERRATION

COMA ABERRATION

COMA ABERRATION

COMA ABERRATION

COMA ABERRATION

FIG.15
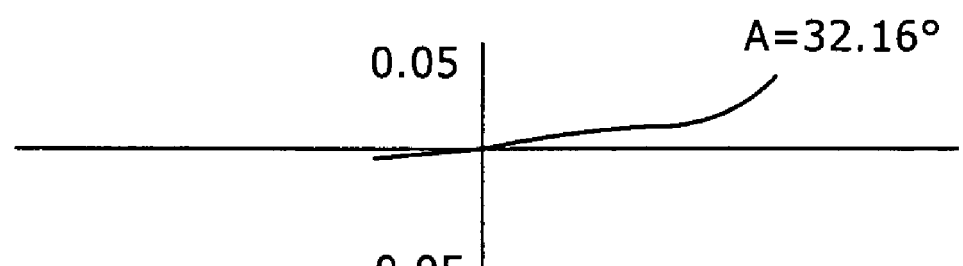
A=32.16°
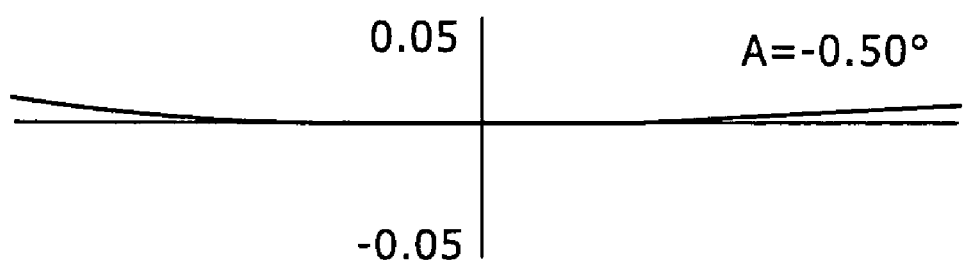
A=-0.50°
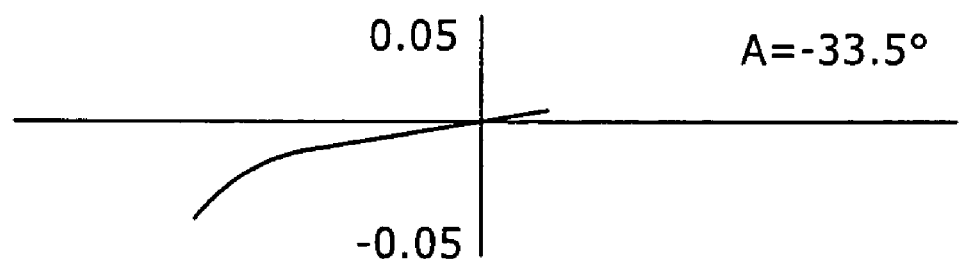
A=-33.5°
COMA ABERRATION

FIG.20
COMA ABERRATION

FIG.21
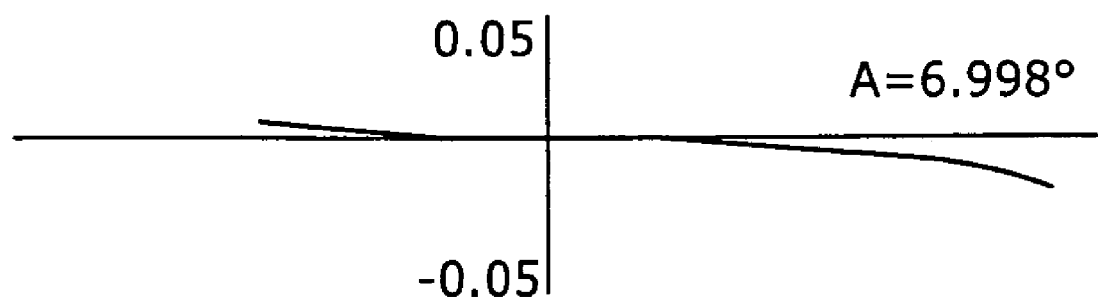
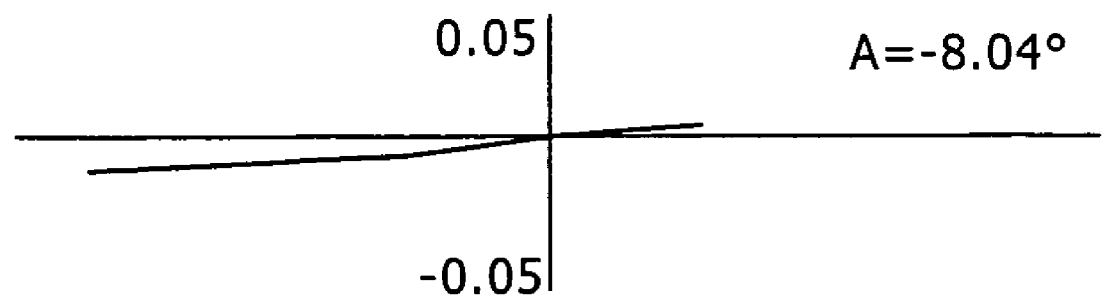
COMA ABERRATION

FIG.22
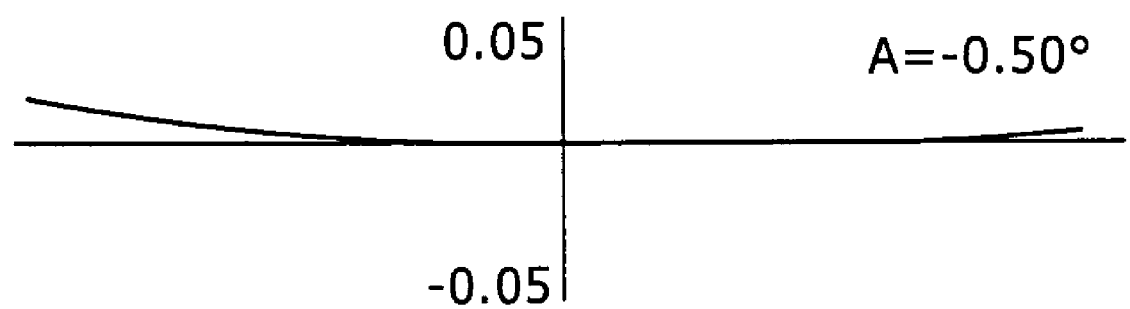
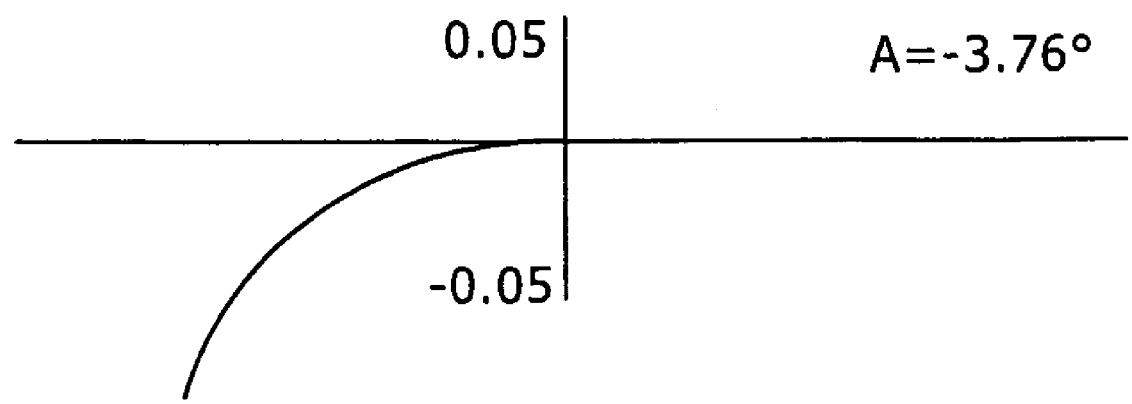
COMA ABERRATION

ZOOM LENS AND IMAGING DEVICE

CROSS REFERENCES TO RELATED APPLICATIONS

The present invention contains subject matter related to Japanese Patent Application JP 2004-287438 filed in the Japanese Patent Office on Sep. 30, 2004, the entire contents of which being incorporated herein by reference.

BACKGROUND OF THE INVENTION

1. Field of the Invention

The present invention relates to a zoom lens and an imaging device. More specifically, this invention is suitable for a camera, such as a video or digital still camera, with imaging elements to receive light and relates to a zoom lens suitable for the correction of blurring and an imaging device equipped with the zoom lens.

2. Description of the Related Art

Already known is a method of forming an image of an object on the surfaces of imaging elements made of photoelectric-conversion elements, such as CCDs (Charge Coupled Devices) or CMOSs (Complementary Metal-Oxide Semiconductors), by using the imaging elements and converting the quantities of light of the image into electric outputs by using the photoelectric-conversion elements.

With the recent technological progress in the field of fine processing, the processing speed of central processing units (CPUs) and the degrees of integration of storage media have been increased and it has become possible to process a large quantity of image data at a high speed. Besides, the degrees of integration of light-receiving elements have been increased to make recording at higher spatial frequency possible and the sizes of light-receiving elements have been reduced to make it possible to produce more compact cameras.

Moreover, zoom lenses are in great demand to cope with various photo-taking situations, and zoom lenses of high zooming ratios in particular are in great demand.

However, the angle of view in the telephoto end state in an optical system of a high zoom ratio is small; therefore, the slight movement of the camera causes heavy blurring of the image. Known under the circumstances is a so-called electronic blurring-compensation system, especially for video cameras of high zoom ratios, which shifts the photo-taking area of the light-receiving elements to compensate for blurring.

Besides, already known is a blurring-compensation optical system wherein the deterioration of optical performance at the time of shift of the position of an image is prevented by shifting a group of some lenses of the lens system in a direction perpendicular to the optical axis of the lens system.

Such a blurring-compensation optical system may include a detecting unit to detect the movement of the camera due to the release of the shutter or the like, a control unit to give correction to the position of a group of lenses based on signals outputted from the detecting unit, and a driving unit to shift the group of lenses based on the output from the control unit.

With the above blurring-compensation optical system, the group of lenses is shifted by the driving unit and, thereby, an image is shifted and the blurring of the image due to the movement of the camera is compensated for.

Such blurring-compensation optical systems are disclosed in patent documents 1, 2, and 3.

In the case of the zoom lens of the patent document 1, a third lens group disposed on the image side of an aperture stop includes a negative and a positive subgroup and an image is shifted by shifting the positive subgroup.

In the case of the zoom lens of the patent document 2, a third lens group disposed on the image side of an aperture stop includes a positive and a negative subgroup and an image is shifted by shifting the positive subgroup.

In the case of the zoom lens of the patent document 3, an image is shifted by shifting the whole of a third lens group.

Patent document 1: Japanese Patent Laid-open No. 2002-244037

Patent document 2: Japanese Patent Laid-open No. 2003-228001

Patent document 3: Japanese Patent Laid-open No. 2003-295057

In the cases of the above blurring-compensation optical systems, a lens group in the vicinity of an aperture stop is shifted; therefore, a driving mechanism to shift the lens group, a mechanism to open and close the aperture stop, and a mechanism to move lenses along the light axis at the times of zooming and focusing are liable to interfere with one another. To avoid such interference, it is necessary to make the diameter of the lens-barrel large.

There is a need for solving the above problem and providing, without increasing the number of lenses, a compact blurring-compensation zoom lens and an imaging device equipped with the zoom lens.

According to an embodiment of the present invention, there is provided a zoom lens including a first lens group with positive refractive power, a second lens group with negative refractive power, a third lens group with positive refractive power, a fourth lens group with positive refractive power, and a fifth lens group including a negative subgroup with negative refractive power and a positive subgroup with positive refractive power. The first to fifth lens groups are arranged from the object side toward the image side in the order of the above description. When the state of lens positions changes from the state of the wide-angle end to the telephoto end state, (i) the first lens group is fixed with respect to a direction of an optical axis, (ii) the second lens group moves toward the image side, (iii) the third lens group is fixed with respect to the direction of the optical axis, (iv) the fourth lens group moves along the optical axis to compensate for the change of the position of the image surface caused by the movement of the second lens group, and (v) the fifth lens group is fixed with respect to the direction of the optical axis. The fourth lens group moves along the optical axis when the zoom lens is focused on an object at a short distance. An aperture stop is disposed in the vicinity of the third lens group. The lens surface of the negative subgroup of the fifth lens group on the image side and nearest to the image is concave, and the lens surface of the positive subgroup of the fifth lens group on the object side and nearest to the object is convex. The positive subgroup shifts in a direction approximately perpendicular to the optical axis to shift an image. The zoom lens satisfies the condition defined by the inequality of "$0.2<f_{5p}/f_t<0.5$", where $f_{5p}$ is the focal length of the positive subgroup of the fifth lens group and $f_t$ is the focal length of the entire lens system in the telephoto end state.

According to an embodiment of the present invention, there is provided an imaging device including a zoom lens and an imaging element to convert an optical image formed by the zoom lens into electric signals. The zoom lens includes a first lens group with positive refractive power, a second lens group with negative refractive power, a third lens group with positive refractive power, a fourth lens group with positive refractive power, and a fifth lens group including a negative subgroup with negative refractive power and a positive subgroup with positive refractive power. The first to fifth lens groups are arranged from the object side toward the image side in the order of the above description. When the state of lens positions changes from the state of the wide-angle end to the telephoto end state, (i) the first lens group is fixed with respect to a direction of an optical axis, (ii) the second lens group moves toward the image side, (iii) the third lens group is fixed with respect to the direction of the optical axis, (iv) the fourth lens group moves along the optical axis to compensate for the change of the position of the image surface caused by the movement of the second lens group, and (v) the fifth lens group is fixed with respect to the direction of the optical axis. The fourth lens group moves along the optical axis when the zoom lens is focused on an object at a short distance. An aperture stop is disposed in the vicinity of the third lens group. The lens surface of the negative subgroup of the fifth lens group on the image side and nearest to the image is concave, and the lens surface of the positive subgroup of the fifth lens group on the object side and nearest to the object is convex. The positive subgroup shifts in a direction approximately perpendicular to the optical axis to shift an image. The zoom lens satisfies the condition defined by the inequality of "$0.2 < f_{5p}/f_t < 0.5$", where $f_{5p}$ is the focal length of the positive subgroup of the fifth lens group and $f_t$ is the focal length of the entire lens system in the telephoto end state.

As described above, according to an embodiment of the present invention, an image is shifted by shifting a lens disposed away from an aperture stop in a direction approximately perpendicular to the optical axis.

The zoom lens according to an embodiment of the present invention includes a first lens group with positive refractive power, a second lens group with negative refractive power, a third lens group with positive refractive power, a fourth lens group with positive refractive power, and a fifth lens group including a negative subgroup with negative refractive power and a positive subgroup with positive refractive power. The first to fifth lens groups are arranged from the object side toward the image side in the order of the above description. When the state of lens positions changes from the state of the wide-angle end to the telephoto end state, (i) the first lens group is fixed with respect to the direction of the optical axis, (ii) the second lens group moves toward the image side, (iii) the third lens group is fixed with respect to the direction of the optical axis, (iv) the fourth lens group moves along the optical axis to compensate for the change of the position of the image surface caused by the movement of the second lens group, and (v) the fifth lens group is fixed with respect to the direction of the optical axis. The fourth lens group moves along the optical axis when the zoom lens is focused on an object at a short distance. An aperture stop is disposed in the vicinity of the third lens group. The lens surface of the negative subgroup of the fifth lens group on the image side and nearest to the image is concave, and the lens surface of the positive subgroup of the fifth lens group on the object side and nearest to the object is convex. The positive subgroup shifts in a direction approximately perpendicular to the optical axis to shift an image. The zoom lens satisfies the condition defined by the inequality of "$0.2 < f_{5p}/f_t < 0.5$", where $f_{5p}$ is the focal length of the positive subgroup of the fifth lens group and $f_t$ is the focal length of the entire lens system in the telephoto end state.

The imaging device according to an embodiment of the present invention includes a zoom lens and an imaging element to convert an optical image formed by the zoom lens into electric signals. The zoom lens includes a first lens group with positive refractive power, a second lens group with negative refractive power, a third lens group with positive refractive power, a fourth lens group with positive refractive power, and a fifth lens group including a negative subgroup with negative refractive power and a positive subgroup with positive refractive power. The first to fifth lens groups are arranged from the object side toward the image side in the order of the above description. When the state of lens positions changes from the state of the wide-angle end to the telephoto end state, (i) the first lens group is fixed with respect to the direction of the optical axis, (ii) the second lens group moves toward the image side, (iii) the third lens group is fixed with respect to the direction of the optical axis, (iv) the fourth lens group moves along the optical axis to compensate for the change of the position of the image surface caused by the movement of the second lens group, and (v) the fifth lens group is fixed with respect to the direction of the optical axis. The fourth lens group moves along the optical axis when the zoom lens is focused on an object at a short distance. An aperture stop is disposed in the vicinity of the third lens group. The lens surface of the negative subgroup of the fifth lens group on the image side and nearest to the image is concave, and the lens surface of the positive subgroup of the fifth lens group on the object side and nearest to the object is convex. The positive subgroup shifts in a direction approximately perpendicular to the optical axis to shift an image. The zoom lens satisfies the condition defined by the inequality of "$0.2 < f_{5p}/f_t < 0.5$", where $f_{5p}$ is the focal length of the positive subgroup of the fifth lens group and $f_t$ is the focal length of the entire lens system in the telephoto end state.

As described above, according to an embodiment of the present invention, the fifth lens group is disposed on the image side of the fourth lens group, and movable, in order to reduce the number of lenses and the weight of the fourth lens group and simplify the mechanism for moving the fourth lens group. Thus, the lens system is made compact.

If the zoom lens according to an embodiment of the present invention is to be equipped with a blurring-compensation mechanism, the mechanism for shifting the lens in a direction approximately perpendicular to the optical axis does not interfere with the lens-driving mechanism for zooming and focusing or the mechanism for opening and closing the aperture stop. Accordingly, the lens barrel, and its diameter in particular, can be made small. In addition, by satisfying the condition defined by the inequality of "$0.2 < f_{5p}/f_t < 0.5$", coma aberration is well compensated for and the lens-shifting mechanism for compensating for blurring is made compact.

The imaging device according to an embodiment of the present invention including the above zoom lens is compact if it is equipped with a blurring-compensation mechanism, and it produces images wherein coma aberration is well compensated for.

According to embodiments of the present invention, the zoom lens satisfies the condition defined by the inequality of "$0.4 < r_p/D_f < 0.8$", where $D_f$ is the distance along the optical axis from the aperture stop to the lens surface of the positive subgroup of the fifth lens group on the object side and nearest to the object and $r_p$ is the radius of curvature of the lens surface of the positive subgroup of the fifth lens group on the object side and nearest to the object. Accordingly, the sensitivity to the inclination of the optical axis between the negative and positive subgroups is reduced and, hence, the effect of assembling precision on the performance is reduced. Besides, the variation of coma aberration in the off-axis area of the image plane, which occurs when blurring is compensated for, is reduced.

According to embodiments of the present invention, the zoom lens satisfies the condition defined by the inequality, "$-0.2<(r_p-r_n)/(r_p+r_n)<0.2$", where $r_n$ is the radius of curvature of the lens surface of the negative subgroup on the image side and nearest to the image. Accordingly, the variation of coma aberration, which occurs in the off-axis area of the image plane when blurring is compensated for, is better compensated for.

According to embodiments of the present invention, the zoom lens satisfies the condition defined by the inequality of "$-0.2<f/f_5<0.2$", where $f_5$ is the focal length of the fifth lens group. Accordingly, the zoom lens is made further compact.

According to embodiments of the present invention, the positive subgroup comprises a positive lens and a negative one, the latter disposed on the image side of the former. Accordingly, the variation of coma aberration, which occurs when blurring is compensated for, is reduced and the overall length of the zoom lens is further reduced.

BRIEF DESCRIPTION OF THE DRAWINGS

Embodiments of the present invention will be described in detail based on the following figures, wherein:

FIG. 15 shows transverse aberration in the telephoto end state;

FIG. 20 shows transverse aberration in the wide-angle-end state;

FIG. 21 shows transverse aberration in the medium-focal-length state;

FIG. 22 shows transverse aberration in the telephoto end state; and

DESCRIPTION OF THE PREFERRED EMBODIMENTS

Figure 1:
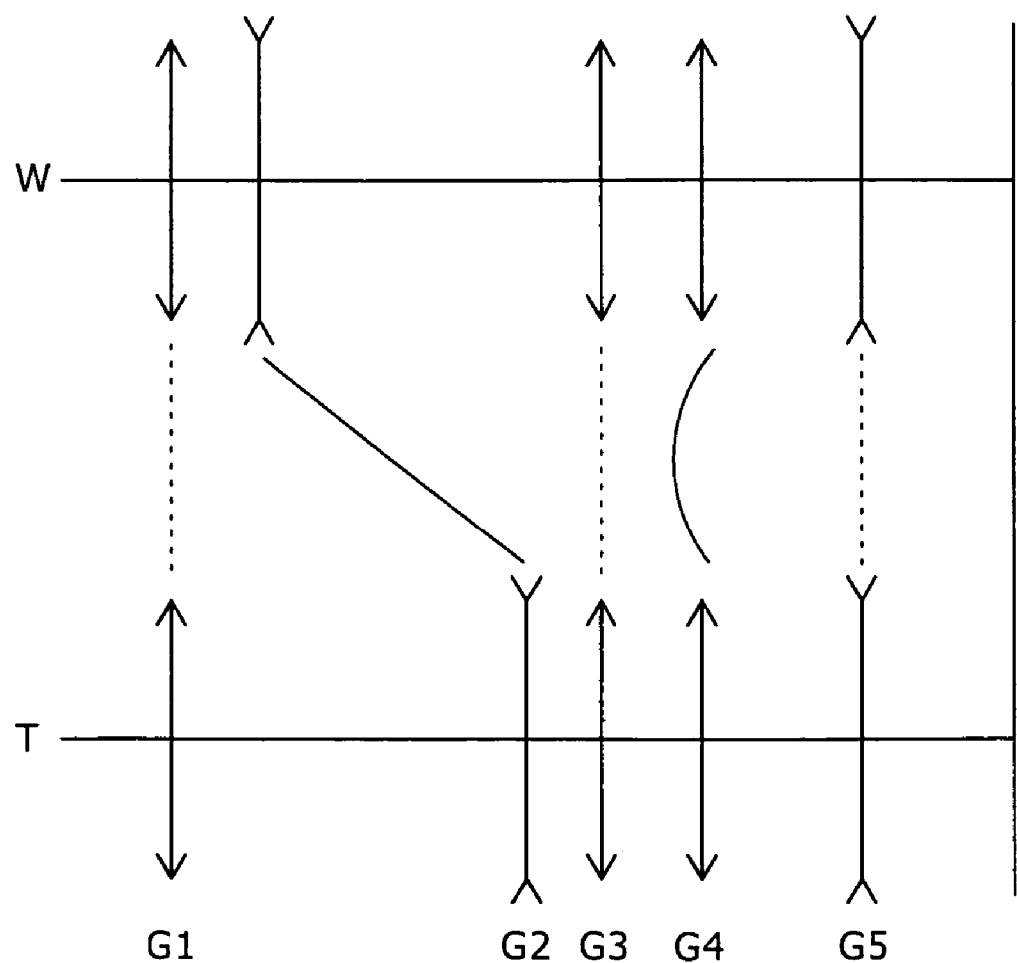
FIG. 1 shows the distribution of refractive power and movability of each lens group during the change of the power of the zoom lens according to an embodiment of the present invention.

By referring to the drawings attached hereto, preferred embodiments of zoom lens and imaging device equipped with the zoom lens of the present invention will be described below.

The zoom lens of the present invention includes a first lens group with positive refractive power, a second lens group with negative refractive power, a third lens group with positive refractive power, a fourth lens group with positive refractive power, and a fifth lens group with positive or negative refractive power which are disposed from the object side toward the image side in the order of description.

The second lens group has a zooming function, and the fourth lens group has a compensating function. The combination of these functions makes it possible for the focal length to change from the state of the wide-angle end to the telephoto end state and the position of the image surface to be kept unchanged while the second lens group moves from the object side to the image side.

The fourth lens group has a focusing function in addition to the compensating function and compensates for the change of the position of the image surface when the position of the object has changed.

The fifth lens group includes a negative subgroup and a positive one. The latter is disposed on the image side of the former, and an air space is provided between them. The image can be shifted by shifting the positive subgroup in a direction approximately perpendicular to the optical axis.

The aperture stop is disposed on the object side of the third lens group.

In the case of the currently available method of shifting the entire third lens group or part of it in a direction perpendicular to the optical axis, it is difficult to shorten the overall length of the zoom lens because the third lens, group includes a positive subgroup and a negative one and a ray flux dispersed by the second lens group is further dispersed by the third one.

Besides, the aperture stop is disposed on the object side of the third lens group, and the movable second and fourth lens groups are disposed on the object and image sides of the third lens group, respectively. Accordingly, if the entire third lens group or part of it is to be shifted in a direction perpendicular to the optical axis, the mechanism for the shift interferes with the mechanism to drive the movable lens groups, the mechanism to open and close the aperture stop, and so on; therefore, it is necessary to increase the diameter of the lenses and provide a large space along the optical axis. Thus, it is difficult to shorten the overall length of the zoom lens and make its diameter small.

According to an embodiment of the present invention, the fifth lens group including a negative and a positive subgroup is disposed on the image side of the fourth lens group and the positive subgroup is shifted so that interference with the movable lens groups, the mechanism to open and close the aperture stop, and so on can be prevented, the space efficiency can be raised, and the overall length and diameter of the zoom lens can be made small.

Because the fifth lens group is disposed away from the aperture stop, off-axis rays passing through the fifth lens group are away from the optical axis; accordingly, the coma aberration is liable to change when the positive subgroup is shifted. It is, therefore, important to meet the following two requirements.

(a) To reduce the refractive power of the positive subgroup as far as possible.
(b) The lens surface of the negative subgroup, which is on the image side and nearest to the image, is concave, and the lens surface of the positive subgroup, which is on the object side and nearest to the object, is convex.

If the refractive power of the positive subgroup is raised, rays of a large aperture ratio enter; accordingly, on-axis aberration has to be well compensated for, which makes it difficult to compensate simultaneously for off-axis aberration, especially the variation of coma aberration which occurs when the positive subgroup is shifted.

Thus, it is important to reduce the refractive power of the positive subgroup as far as possible.

If the refractive power of the positive subgroup is reduced too much, the zoom lens becomes longer.

To reduce the refractive power of the positive subgroup while the distance from the positive subgroup to the image surface is kept unchanged, it is important that the lens surface of the positive subgroup, which is on the object side and nearest to the object, is convex.

However, if the above lens surface is heavily convex, the variation of coma aberration at the time of shift of the positive subgroup becomes larger.

According to the present invention, the lens surface of the negative subgroup, which is on the image side and nearest to the image, is concave while the lens surface of the positive subgroup, which is on the object side and nearest to the object, is convex, so that the change of the length of optical paths of rays going toward the upper and lower sides of the image plane is reduced and the coma aberration is well compensated for.

With the above construction, the zoom lens of the present invention is compact and yet capable of reducing the deterioration of images which occurs when the positive subgroup of the fifth lens group is shifted.

The zoom lens according to an embodiment of the present invention has to satisfy the condition defined by the following inequality (1).

$$0.2 < f_{5p}/f_t < 0.5$$

where $f_{5p}$ is the focal length of the positive subgroup of the fifth lens group and $f_t$ is the focal length of the entire lens system in the telephoto end state. The above inequality (1) defines the focal length of the positive subgroup of the fifth lens group to satisfy the above requirement (a).

If $f_{5p}/f_t$ is below the lower limit 0.2, off-axis rays passing through the fifth lens group are away from the optical axis; accordingly, it is difficult to compensate for the variation of coma aberration which occurs when the positive subgroup is shifted in a direction perpendicular to the optical axis.

If $f_{5p}/f_t$ goes beyond the upper limit 0.5, the blurring-correction factor is reduced or the zoom lens becomes longer. If the blurring-correction factor is reduced, the correction of blurring requires a large shift of the positive subgroup, which makes the mechanism to shift the positive subgroup large. If the zoom lens becomes longer, it is difficult to make the lens system compact.

It is desirable for the zoom lens according to an embodiment of the present invention to satisfy the condition defined by the following inequality (2) so that stable optical performance of the zoom lens can be secured when it is manufactured;

$$0.4 < r_p/D_f < 0.8$$

where $D_f$ is the distance along the optical axis from the aperture stop to the lens surface of the positive subgroup on the object side and nearest to the object and $r_p$ is the radius of curvature of the lens surface of the positive subgroup on the object side and nearest to the object. The above inequality (2) defines the shapes of the lenses of the positive subgroup of the fifth lens group to satisfy the above requirement (b).

If $r_p/D_f$ goes beyond the upper limit 0.8 (the radius of curvature becomes larger), the position of the principal point of the positive subgroup moves toward the image side and the refractive power of the positive subgroup becomes stronger. Accordingly, the variation of coma aberration, which occurs in the off-axis area of the image plane when the positive subgroup is shifted, becomes larger and it becomes difficult to secure excellent optical performance.

If $r_p/D_f$ goes below the lower limit 0.4 (the radius of curvature becomes smaller), the optical performance in the off-axis area of the image plane is reduced by the minute inclination of the axis which occurs between the negative and positive subgroups when the zoom lens is manufactured. If the minute inclination is to be eliminated, it requires a complex mechanism, and the complex mechanism raises the manufacturing cost of the zoom lens.

It is desirable for the zoom lens according to an embodiment of the present invention to satisfy the condition defined by the following inequality (3) so that the variation of coma aberration, which occurs in the off-axis area of the image plane at the time of the correction of blurring (the shift of the positive subgroup), can be better compensated for;

$$-0.2 < (r_p - r_n)/(r_p + r_n) < 0.2$$

where $r_n$ is the radius of curvature of the lens surface of the negative subgroup on the image side and nearest to the image. The above inequality (3) defines the shape of the air space to be formed between the negative and positive subgroups of the fifth lens group.

If $(r_p - r_n)/(r_p + r_n)$ goes beyond the upper limit (R on the front side becomes loose), the variation of coma aberration, which occurs in the off-axis area of the image plane when the positive subgroup is shifted, becomes larger and it becomes difficult to secure enough optical performance.

If $(r_p - r_n)/(r_p + r_n)$ goes below the lower limit (R on the front side becomes tight), it is necessary to widen the air space to prevent the negative and positive subgroups from interfering with each other when the positive subgroup is shifted, and so the space efficiency is reduced. Besides, as the position of the principal point of the positive subgroup moves toward the image side, the refractive power of the positive subgroup has to be raised, and it becomes difficult to reduce the "change of the angle of view" which occurs when the positive subgroup is shifted.

The above "change of the angle of view" means the difference between the change of the angle of view in the central area of the image plane and the change of the angle of view in the off-axis area of the image plane which occurs when the positive subgroup is shifted. If the "change of the angle of view" becomes larger, the blurring in the off-axis area cannot be corrected well if the blurring in the central area can be corrected well. Thus, it becomes difficult to stabilize the position of the image.

It is desirable for the zoom lens according to an embodiment of the present invention to satisfy the condition defined by the following inequality (4) as well as the one (1) for compactness;

$$-0.2 < f/f_5 < 0.2$$

where $f_5$ is the focal length of the fifth lens group. The above inequality (4) defines the focal length of the fifth lens group.

If $f/f_5$ goes beyond the upper limit (the fifth lens group has strong positive refractive power), the refractive power of the fourth lens group is reduced. The movement of the fourth lens group when the focal length changes from the state of the wide-angle end to the telephoto end state and that of the fourth lens group when the zoom lens is focused on an object at a short distance become larger, making it difficult to reduce the overall length of the zoom lens sufficiently.

If $f/f_5$ goes below the lower limit (the fifth lens group has strong negative refractive power), the refractive power of the first and second lens groups is raised. The off-axis rays passing through the first lens group in particular go away from the optical axis, requiring a large lens diameter.

To reduce further the overall length of the zoom lens and reduce the variation of coma aberration which occurs when the positive subgroup of the fifth lens group is shifted, it is desirable for the positive subgroup to include a positive lens and a negative lens, the latter disposed on the image side of the former. With this construction of the positive subgroup, the position of the principal point of composition can be moved toward the object side. Thus, the focal length of the positive subgroup can be eased.

The optical performance of the zoom lens of an embodiment of the present invention can be made excellent by using an aspherical lens. By inserting an aspherical surface into the fifth lens group in particular, the central performance can be raised more. Besides, by using an aspherical lens in the second lens group, the variation of coma aberration due to the angle of view occurring in the state of the wide-angle end can be well compensated for.

Moreover, by using a plurality of aspherical surfaces in an optical system, high optical performance can be achieved.

Furthermore, a low-pass filter may be disposed on the image side of a lens system to prevent the occurrence of moire fringes, or an infrared-cut-off filter may be disposed on the image side of a lens system in accordance with the spectral-sensitivity characteristics of light-receiving elements.

Zoom lenses according to embodiments of the present invention and examples of the numerical values of specifications of the embodiments will be described below.

An aspherical surface is used in each embodiment and its shape is defined by the formula below;

$$x = cy^2/[1+\{1-(1+.)c^2y^2\}^{1/2}] + c_4y^4 + c_6y^6 +$$

The above y is the height from the optical axis; x, is the sag; c is the curvature; K, the cone constant; and $C_4$, $C_6$, ..., are the aspherical coefficients.

FIG. 1 shows the distribution of refractive power of the zoom lens according to an embodiment of the present invention. A first lens group G1 of positive refractive power, a second lens group G2 of negative refractive power, a third lens group G3 of negative refractive power, a fourth lens group G4 of positive refractive power, and a fifth lens group G5 of positive or negative refractive power are arranged from the object side toward the image side in the order of the description. While the power of the zoom lens is changed from the state of the wide-angle end to the telephoto end state, the second lens group G2 moves toward the image side to elongate the air space between the first and second lens groups G1 and G2 and shorten the air space between the second and third lens groups G2 and G3, whereas the first, third, and fifth lens groups G1, G3, and G5 do not move, and the fourth lens group G4 moves to compensate for the change of the position of the image surface caused by the movement of the second lens group G2. Besides, the fourth lens group G4 moves toward the object side when the zoom lens is focused on an object at a short distance.

Figure 2:
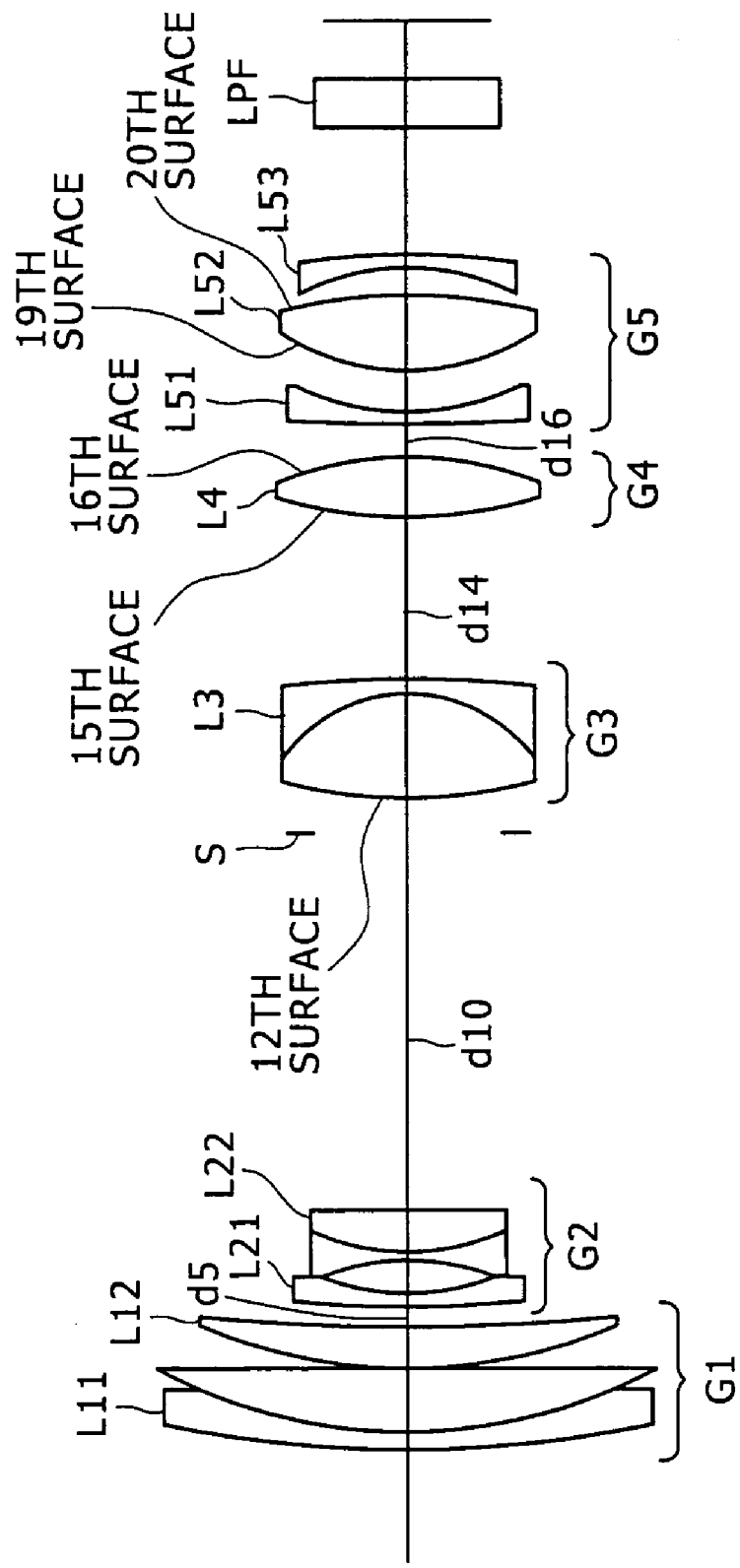
FIG. 2 shows the lenses of the zoom lens of the first embodiment of the present invention.

FIG. 2 shows the lenses of the zoom lens of the first embodiment of the present invention. The first lens group G1 includes a cemented lens L11 and a positive lens L12. The cemented lens L11 include a meniscus-shaped negative lens whose convex surface is directed toward the object side and a positive lens with a convex surface directed toward the object side. The positive lens L12 has a convex surface directed toward the object side. The second lens group G2 includes a negative lens L21 and a cemented lens L22. The negative lens L21 has a concave surface directed toward the image side. The cemented lens L22 includes a negative lens with two concave surfaces and a positive lens with one convex surface directed toward the object side. The third lens group G3 includes a cemented positive lens L3, which includes a positive lens with two convex surfaces and a negative meniscus lens. The fourth lens group G4 includes a positive lens L4 with two convex surfaces. The fifth lens group G5 includes a negative lens L51 with a concave surface directed toward the image side, a positive lens L52 with two convex surfaces, and a meniscus-shaped negative lens L53 with its concave surface directed toward the object side.

In the first embodiment, an aperture stop "S" is disposed on the object side of the third lens group G3 and fixed regardless of the movement of lenses.

The negative lens L51 of the fifth lens group G5 functions as a negative subgroup, and the positive and negative lenses L52 and L53 of the fifth lens group G5 function as a positive subgroup. An image is shifted when the positive subgroup of the fifth lens group G5 is shifted in a direction perpendicular to the optical axis.

A low-pass filter "LPF" is disposed on the image side of the fifth lens group G5.

Table 1 shows an example of the numerical values of specifications of the first embodiment. In the following specification tables, f is the focal length, FNo in the F number, and 2ω is the angle of view. The refractive index and the Abbe number are relative to the d-line (.=587.6 nm). The radius of curvature of zero in Table 1 means a plane.

TABLE 1 f: 5.51–22.61–49.98
F No.: 1.85–2.23–2.87
2.: 65.96–15.02–6.66°

| Surface No. | Radius of curvature | Distance between surfaces | Refractive index | Abbe number |
|---|---|---|---|---|
| 1 | 49.4288 | 0.800 | 1.92286 | 20.9 |
| 2 | 23.5646 | 2.800 | 1.75500 | 52.3 |
| 3 | 584.7989 | 0.200 | | |
| 4 | 23.4506 | 1.840 | 1.80420 | 46.5 |
| 5 | 86.9721 | (D5) | | |
| 6 | 86.9721 | 0.400 | 1.83500 | 43.0 |
| 7 | 8.8702 | 1.700 | | |
| 8 | −9.8573 | 0.400 | 1.83500 | 43.0 |
| 9 | 9.8060 | 1.980 | 1.92286 | 20.9 |
| 10 | −169.7152 | (D10) | | |
| 11 | 0.0000 | 1.700 | (Aperture stop) | |
| 12 | 21.7655 | 4.800 | 1.69350 | 53.4 |
| 13 | −6.8222 | 0.600 | 1.83400 | 37.4 |
| 14 | −36.8849 | (D14) | | |
| 15 | 18.4649 | 2.720 | 1.48749 | 70.4 |
| 16 | −14.0920 | (D16) | | |
| 17 | 182.3135 | 0.500 | 1.75500 | 52.3 |
| 18 | 12.3758 | 1.872 | | |
| 19 | 11.1111 | 3.450 | 1.74400 | 44.8 |
| 20 | −19.1626 | 1.240 | | |
| 21 | −10.7316 | 0.500 | 1.92286 | 20.9 |
| 22 | −37.2620 | 5.842 | | |
| 23 | 0.0000 | 2.050 | 1.51680 | 64.2 |
| 24 | 0.0000 | (Bf) | | |

The 12th, 15th, 16th, 19th, and 20th lens surfaces are aspheric. The coefficients of aspheric surfaces are shown in Table 2. "E-i" in the following tables means $10^{-i}$. For example, "0.26029E-05" means "$0.26029 \times 10^{-5}$"

TABLE 2

[12th Lens Surface]

. = −1.0601  $C_4$ = +0.26029E−05  $C_6$ = −0.90498E−06
        $C_8$ = +0.63474E−07  $C_{10}$ = −0.62466E−09

[15th Lens Surface]

. = +0.5676  $C_4$ = −0.71573E−04  $C_6$ = +0.16061E−05
        $C_8$ = −0.42143E−07  $C_{10}$ = +0.51743E−09

[16th Lens Surface]

. = +0.0000  $C_4$ = +0.97327E−04  $C_6$ = +0.35360E−06
        $C_8$ = +0.00000E+00  $C_{10}$ = +0.00000E+00

[19th Lens Surface]

. = −0.6164  $C_4$ = +0.11407E−03  $C_6$ = +0.10888E−05
        $C_8$ = +0.44850E−07  $C_{10}$ = +0.26525E−09

[20th Lens Surface]

. = +0.0000  $C_4$ = −0.84437E−05  $C_6$ = +0.18646E−05
        $C_8$ = +0.00000E+00  $C_{10}$ = +0.00000E+00

As the state of lens positions changes from the wide-angle-end state to the telephoto end state, the face-to-face distance $d_5$ between the first and second lens groups G1 and G2, the face-to-face distance $d_{10}$ between the second lens group G2 and the aperture stop "S", the face-to-face distance $d_{14}$ between the third and fourth lens groups G3 and G4, and the face-to-face distance $d_{16}$ between the fourth and fifth lens groups G4 and G5 change. Table 3 shows the focal length f and the face-to-face distances $d_5$, $d_{10}$, $d_{14}$, and $d_{16}$ in the wide-angle-end state, medium-focal-length state, and telephoto end state.

TABLE 3

(Table of Variable Distances)

| f | 5.510 | 22.612 | 49.982 |
|---|---|---|---|
| $d_5$ | 0.900 | 12.305 | 17.339 |
| $d_{10}$ | 17.239 | 5.834 | 0.800 |
| $d_{14}$ | 7.357 | 3.239 | 7.341 |
| $d_{16}$ | 1.600 | 5.718 | 1.616 |
| Bf | 2.494 | 2.494 | 2.494 |

Table 4 shows the values corresponding to the equations (1) to (4) in the example 1 of numerical values.

TABLE 4

$f_{5p}$ = 18.205
$f_5$ = −464.742
(1) $f_{5p}/f_t$ = 0.364
(2) $r_p/D_f$ = 0.525
(3) $(r_p - r_n)/(r_p + r_n)$ = 0.054
(4) $f_t/f_5$ = −0.108

Figure 3:
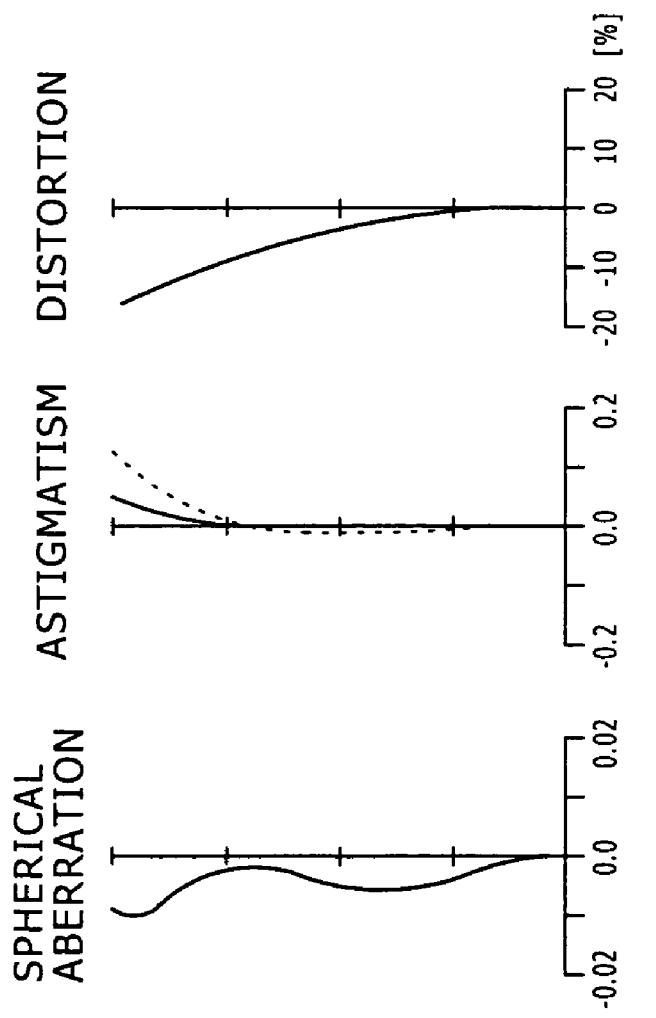
FIG. 3 shows, together with FIGS. 4 to 8, aberration in the example 1 of numerical values in which specific values are applied to the zoom lens of a first embodiment of the present invention and, in particular, it shows spherical aberration, astigmatism, distortion, and coma aberration in the wide-angle-end state.
Figure 4:
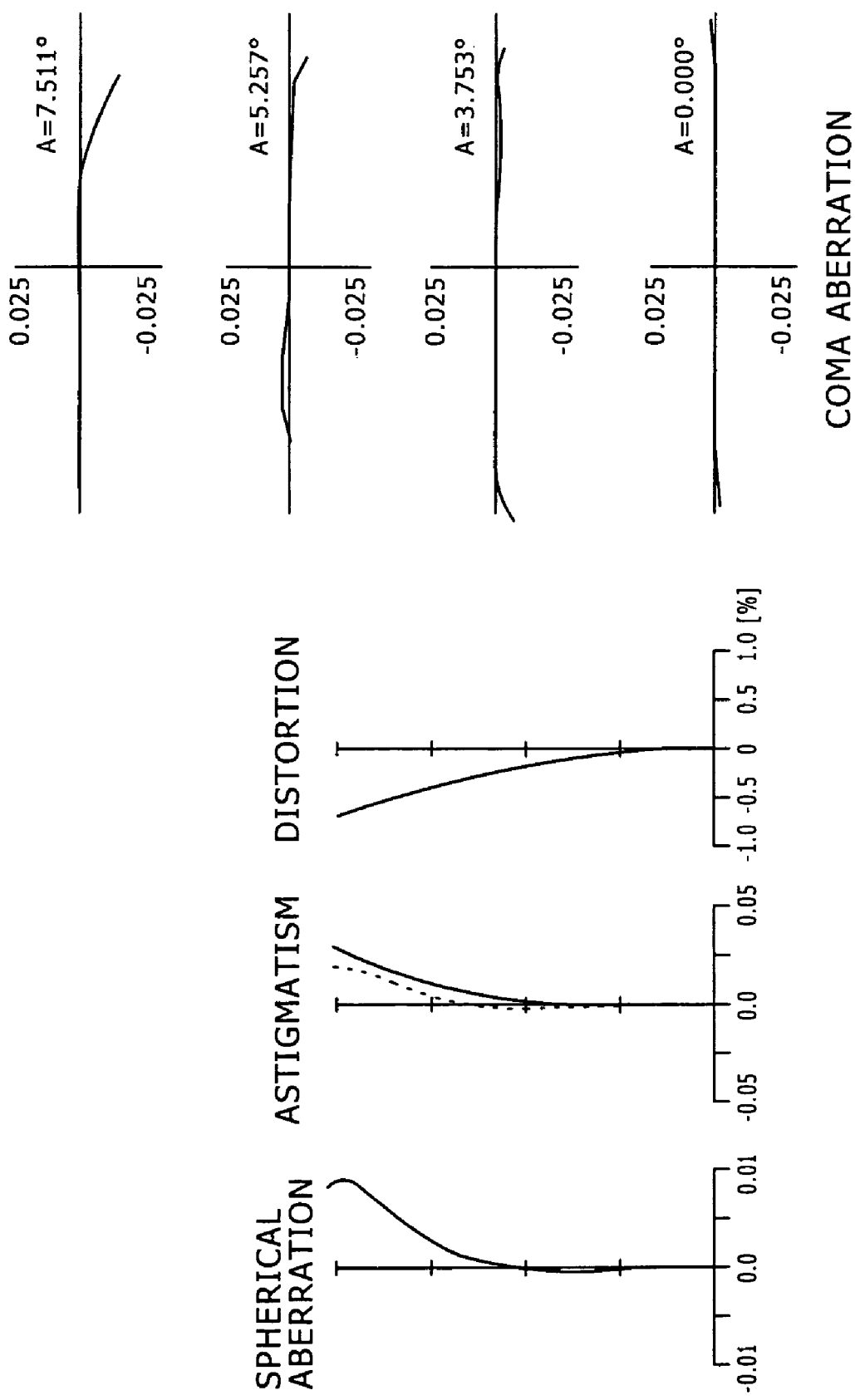
FIG. 4 shows spherical aberration, astigmatism, distortion, and coma aberration in the medium-focal-length state.
Figure 5:
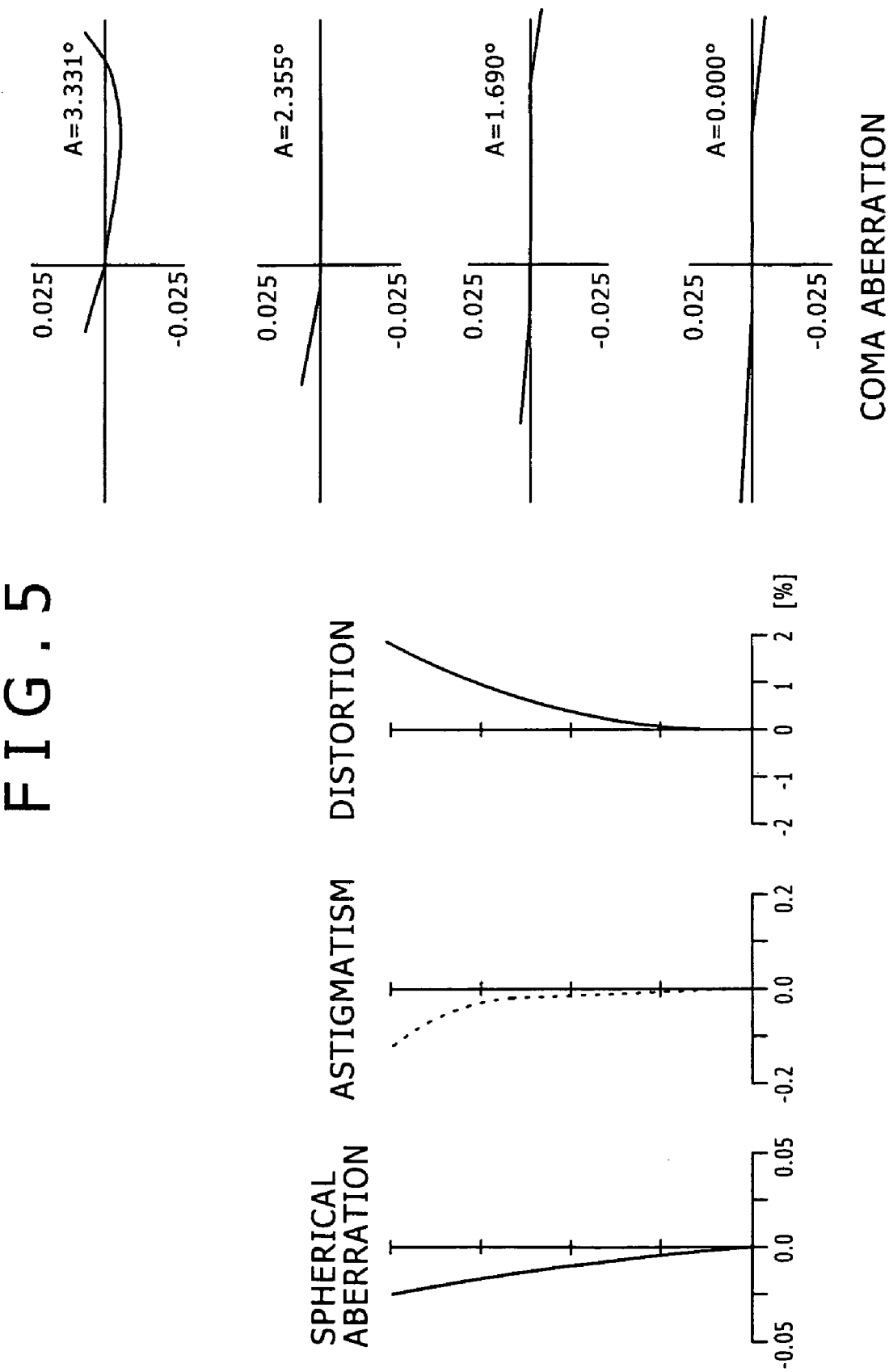
FIG. 5 shows spherical aberration, astigmatism, distortion, and coma aberration in the telephoto end state.

FIGS. 3, 4, and 5 show aberration in the infinite-distance-focusing state in the example 1 of numerical values. FIG. 3 shows aberration in the wide-angle-end state (f=5.510); FIG. 4 shows aberration in the medium-focal-length state (f=22.612); and FIG. 5 shows aberration in the telephoto end state (f=49.982).

The solid line and the broken line in the astigmatism graph of each of FIGS. 3, 4, and 5 show the astigmatism of the sagittal image and that of the meridional image, respectively. In the coma aberration graph, "A" denotes an angle of view.

Figure 6:
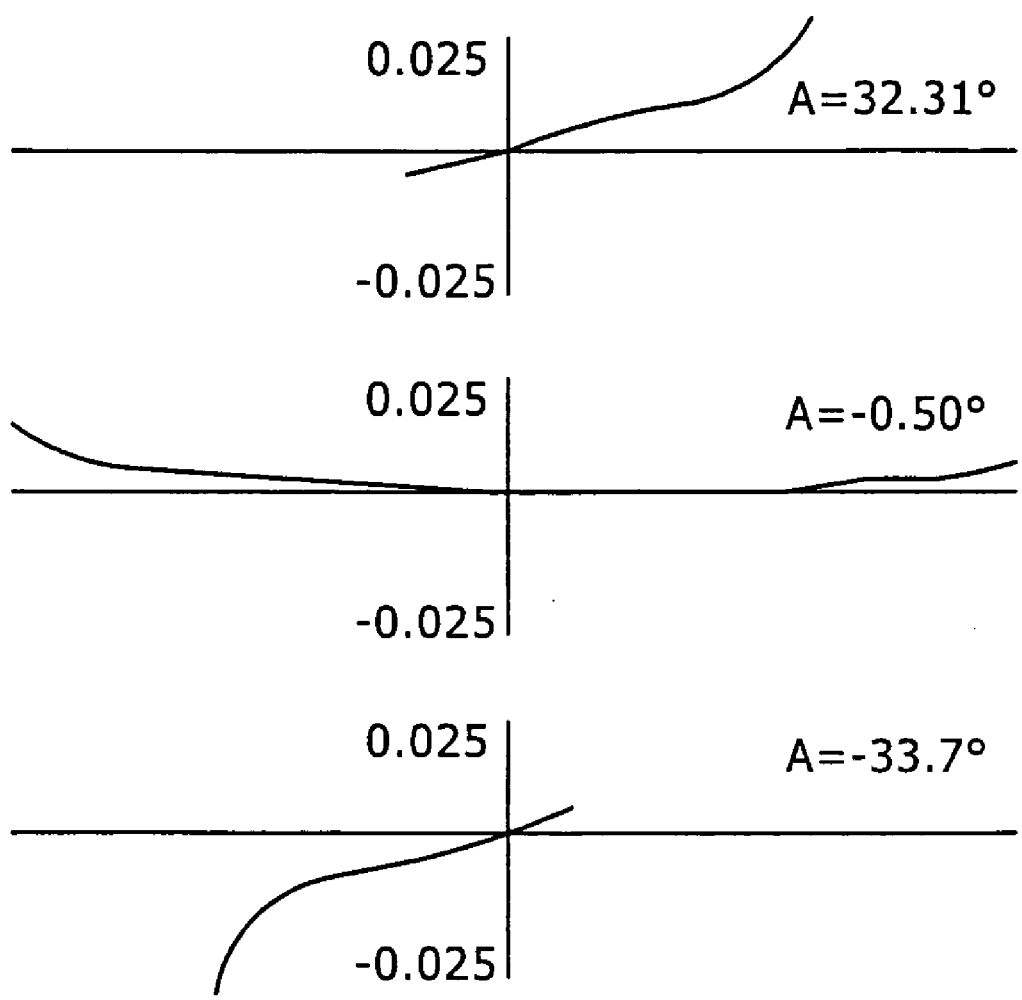
FIG. 6 shows transverse aberration in the wide-angle-end state.
Figure 7:
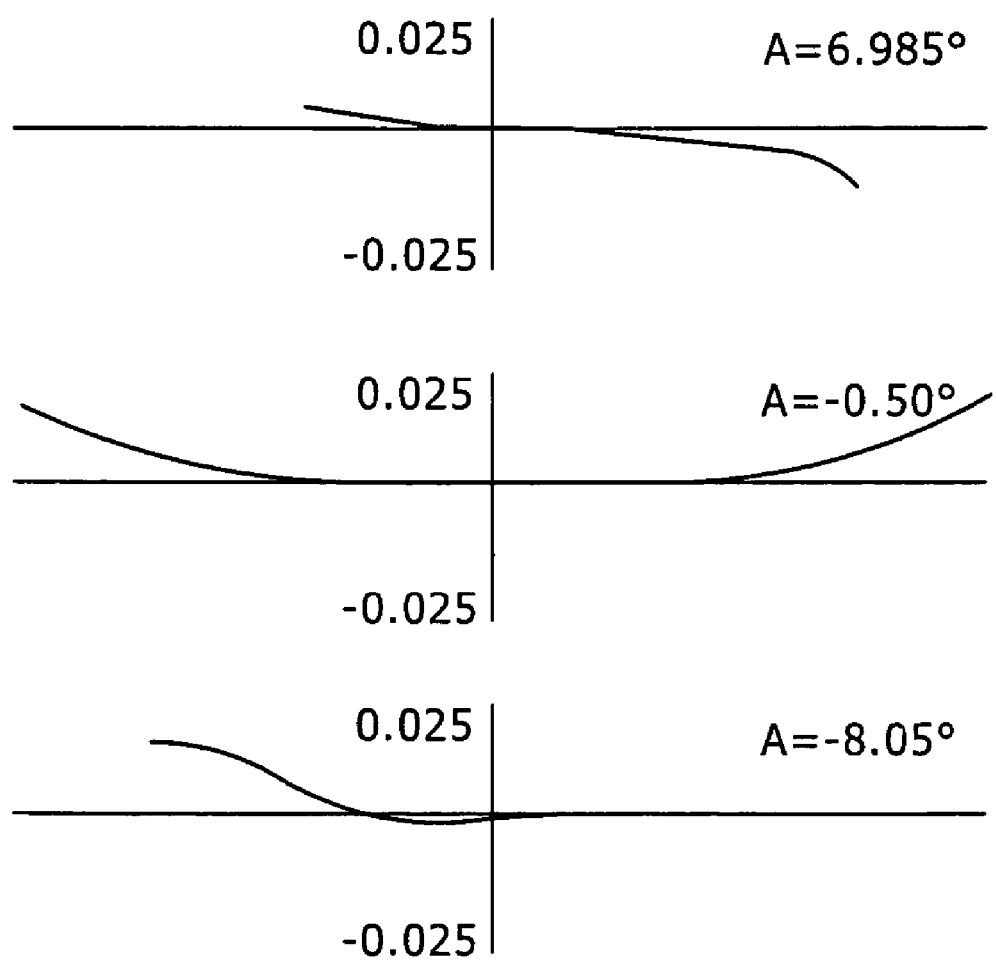
FIG. 7 shows transverse aberration in the medium-focal-length state.
Figure 8:
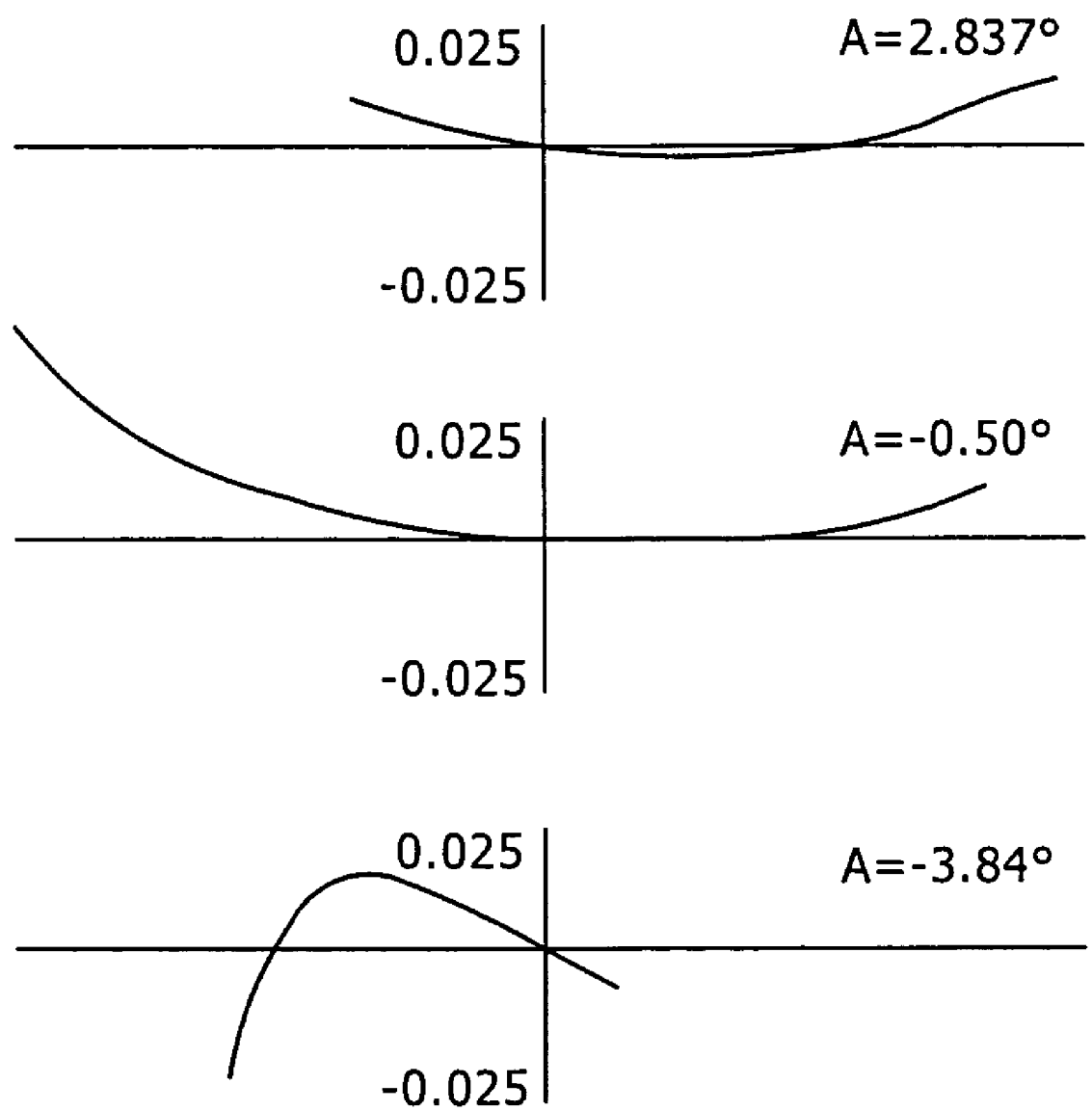
FIG. 8 shows transverse aberration in the telephoto end state.

FIGS. 6, 7, and 8 show transverse aberration in the infinite-distance-focusing state, with a lens shift equivalent to 0.5 degree, in the example 1 of numerical values. FIG. 6 shows transverse aberration in the wide-angle-end state (f=5.510); FIG. 7 shows transverse aberration in the medium-focal-length state (f=22.612); FIG. 8 shows transverse aberration in the telephoto end state (f=49.982).

FIGS. 3 to 8 show that various types of aberration are sufficiently compensated for and the optical performance is high in example 1 of the numerical values.

Figure 9:
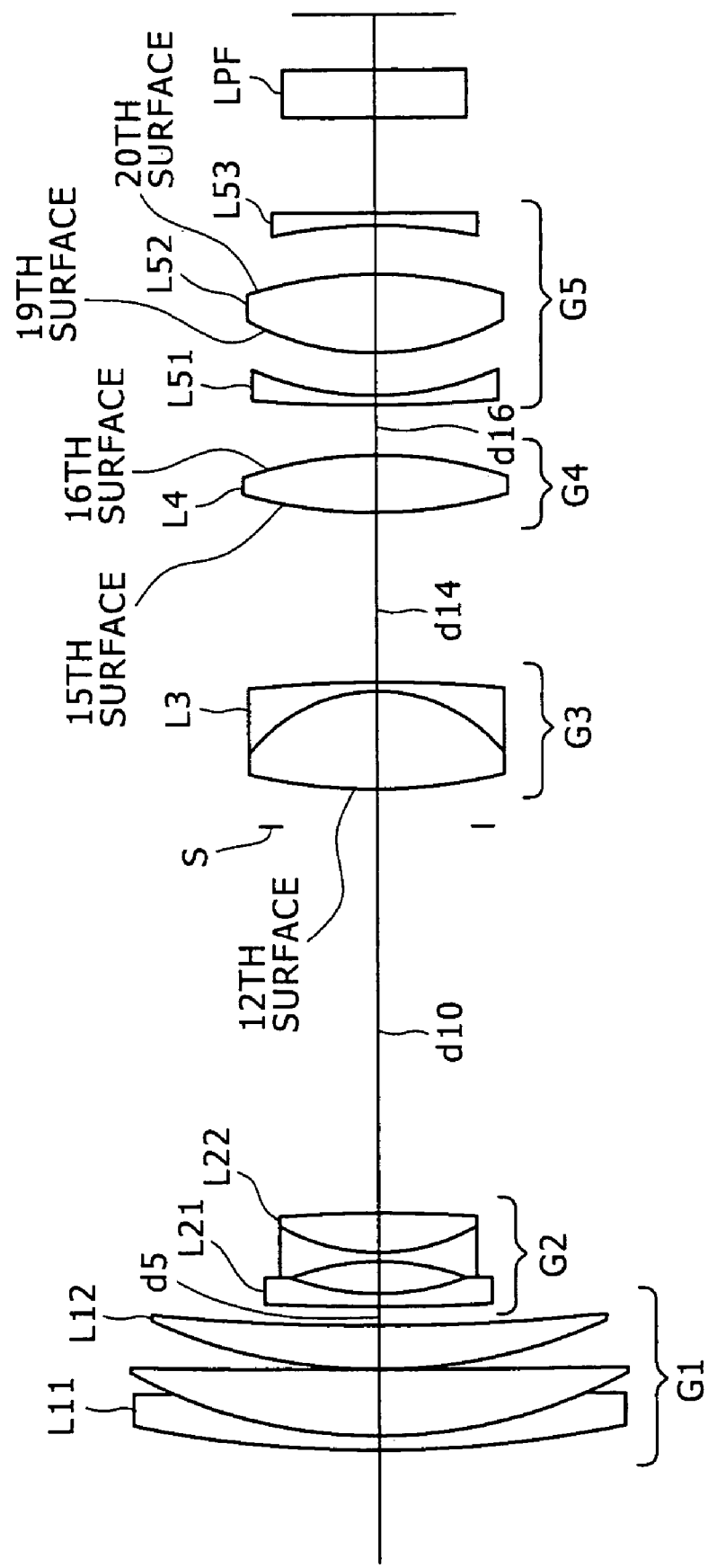
FIG. 9 shows the lenses of the zoom lens of a second embodiment of the present invention.

FIG. 9 shows the lenses of the zoom lens of the second embodiment of the present invention. The first lens group G1 includes a cemented lens L11 and a positive lens L12. The cemented lens L11 includes a meniscus-shaped negative lens whose convex surface is directed toward the object side and a positive lens with a convex surface directed toward the object side. The positive lens L12 has a convex surface directed toward the object side. The second lens group G2 includes a negative lens L21 and a cemented lens L22. The negative lens L21 has a concave surface directed toward the image side. The cemented lens L22 includes a negative lens with two concave surfaces and a positive lens with one convex surface directed toward the object side. The third lens group G3 includes a cemented positive lens L3, which includes a positive lens with two convex surfaces and a negative meniscus lens. The fourth lens group G4 includes a positive lens L4 with two convex surfaces. The fifth lens group G5 includes a negative lens L51 with a concave surface directed toward the image side, a positive lens L52 with two convex surfaces, and a negative lens L53 with one concave surface directed toward the object side.

In the second embodiment, an aperture stop "S" is disposed on the object side of the third lens group G3 and fixed regardless of the movement of lenses.

In the second embodiment, the negative lens L51 of the fifth lens group G5 functions as a negative subgroup, and the positive and negative lenses L52 and L53 of the fifth lens group G5 function as a positive subgroup. An image is shifted when the positive subgroup of the fifth lens group G5 is shifted in a direction perpendicular to the optical axis.

A low-pass filter "LPF" is disposed on the image side of the fifth lens group G5.

Table 5 shows an example of the numerical values of specifications of the second embodiment.

TABLE 5 f: 5.51–22.51–49.97
F No.: 1.85–2.55–2.88
2.: 65.62–15.05–6.63°

| Surface No. | Radius of curvature | Distance between surfaces | Refractive index | Abbe number |
|---|---|---|---|---|
| 1 | 50.1290 | 0.800 | 1.92286 | 20.9 |
| 2 | 24.1049 | 2.787 | 1.75500 | 52.3 |
| 3 | 561.1862 | 0.200 | | |
| 4 | 23.7975 | 1.830 | 1.80420 | 46.5 |
| 5 | 87.2245 | (D5) | | |
| 6 | 87.2245 | 0.400 | 1.88300 | 40.8 |
| 7 | 9.1279 | 1.719 | | |
| 8 | −9.8560 | 0.400 | 1.83500 | 43.0 |
| 9 | 10.8770 | 1.583 | 1.92286 | 20.9 |
| 10 | −72.5778 | (D10) | | |
| 11 | 0.0000 | 1.300 | (Aperture stop) | |
| 12 | 24.4842 | 4.359 | 1.69350 | 53.4 |
| 13 | −6.9908 | 0.600 | 1.83400 | 37.4 |
| 14 | −36.6545 | (D14) | | |
| 15 | 19.3363 | 2.719 | 1.48749 | 70.4 |
| 16 | −14.3481 | (D16) | | |
| 17 | 400.6132 | 0.500 | 1.78800 | 47.5 |
| 18 | 14.0404 | 1.774 | | |
| 19 | 11.1111 | 3.500 | 1.69350 | 53.4 |
| 20 | −22.5620 | 2.400 | | |
| 21 | −17.6972 | 0.500 | 1.92286 | 20.9 |
| 22 | 0.0000 | 4.192 | | |
| 23 | 0.0000 | 2.050 | 1.51680 | 64.2 |
| 24 | 0.0000 | (Bf) | | |

The 12th, 15th, 16th, 19th, and 20th lens surfaces are aspheric. The coefficients of aspheric surfaces are shown in Table 6.

TABLE 6

[12th Lens Surface]

. = −2.8791  $C_4$ = +0.16265E−04  $C_6$ = −0.15272E−05
$C_8$ = +0.80818E−07  $C_{10}$ = −0.76494E−09

[15th Lens Surface]

. = +0.8494  $C_4$ = −0.72890E−04  $C_6$ = +0.25022E−05
$C_8$ = −0.49074−07  $C_{10}$ = +0.55713E−09

[16th Lens Surface]

. = +0.0000  $C_4$ = +0.79265E−04  $C_6$ = +0.10623E−05
$C_8$ = +0.00000E+00  $C_{10}$ = +0.00000E+00

[19th Lens Surface]

. = −5.0000  $C_4$ = +0.43825E−03  $C_6$ = −0.82652E−05
$C_8$ = +0.12196E−06  $C_{10}$ = −0.21059E−08

[20th Lens Surface]

. = +0.0000  $C_4$ = +0.49138E−04  $C_6$ = −0.29193E−05
$C_8$ = +0.00000E+00  $C_{10}$ = +0.00000E+00

As the state of lens positions changes from the wide-angle-end state to the telephoto end state, the face-to-face distance $d_5$ between the first and second lens groups G1 and G2, the face-to-face distance $d_{10}$ between the second lens group G2 and the aperture stop "S", the face-to-face distance $d_{14}$ between the third and fourth lens groups G3 and G4, and the face-to-face distance $d_{16}$ between the fourth and fifth lens groups G4 and G5 change. Table 7 shows the focal length f and the face-to-face distances $d_5$, $d_{10}$, $d_{14}$, and $d_{16}$ in the wide-angle-end state, medium-focal-length state, and telephoto end state.

TABLE 7

(Table of Variable Distances)

| f | 5.510 | 22.511 | 49.971 |
|---|---|---|---|
| $d_5$ | 0.900 | 12.463 | 17.813 |
| $d_{10}$ | 17.713 | 6.151 | 0.800 |
| $d_{14}$ | 7.634 | 3.324 | 8.245 |
| $d_{16}$ | 2.229 | 6.538 | 1.618 |
| Bf | 2.493 | 2.493 | 2.493 |

Table 8 shows the values corresponding to the equations (1) to (4) in the example 2 of numerical values.

TABLE 8

$f_{5p}$ = 18.205
$f_5$ = −371.49
(1) $f_{5p}/f_t$ = 0.364
(2) $r_p/D_f$ = 0.604
(3) $(r_p − r_n)/(r_p + r_n)$ = 0.116
(4) $f_t/f_5$ = −0.135

Figure 10:
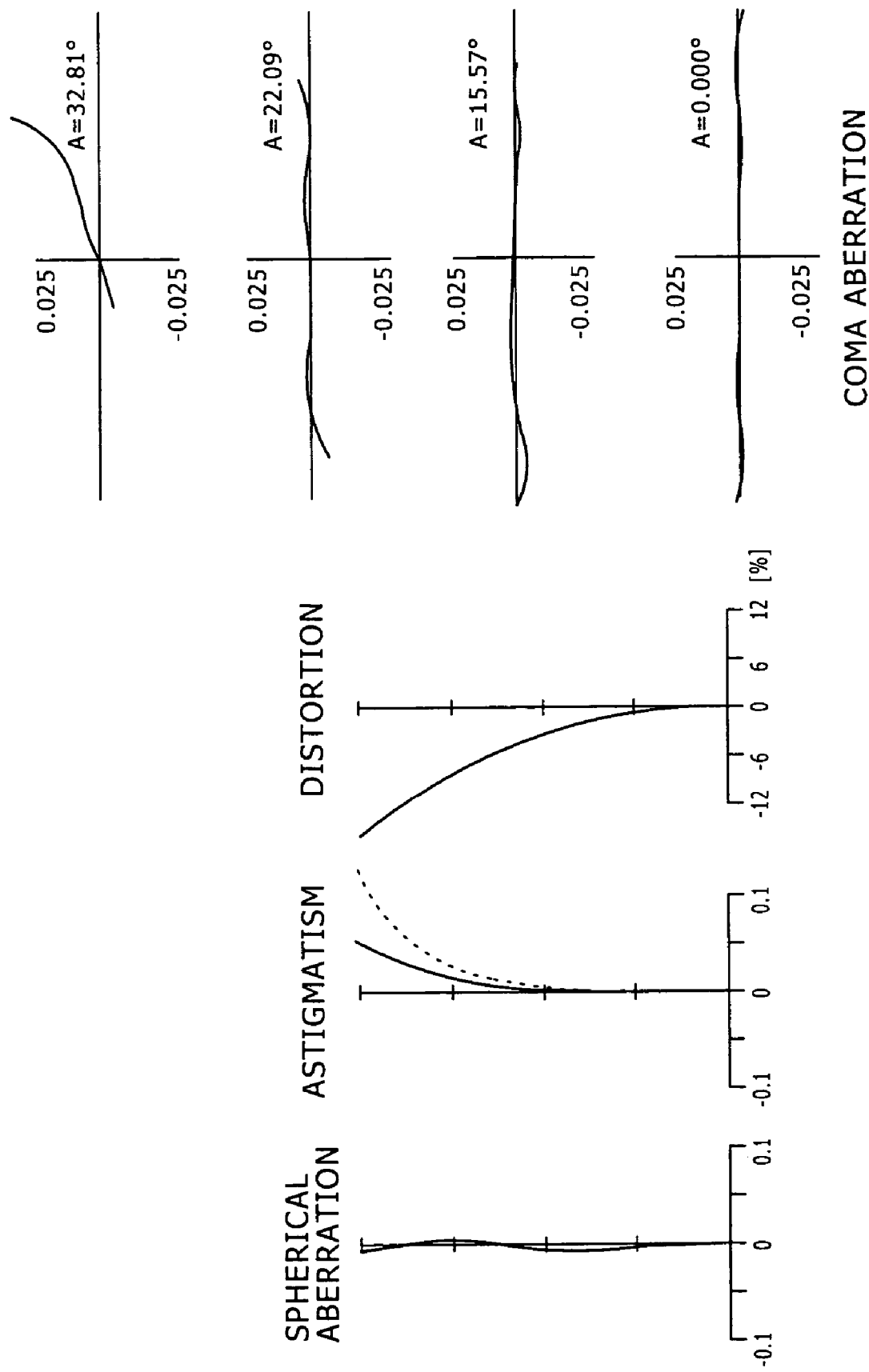
FIG. 10 shows, together with FIGS. 11 to 15, aberration in the example 2 of numerical values in which specific values are applied to the second embodiment of the zoom lens of the present invention and, in particular, it shows spherical aberration, astigmatism, distortion, and coma aberration in the wide-angle-end state.
Figure 11:
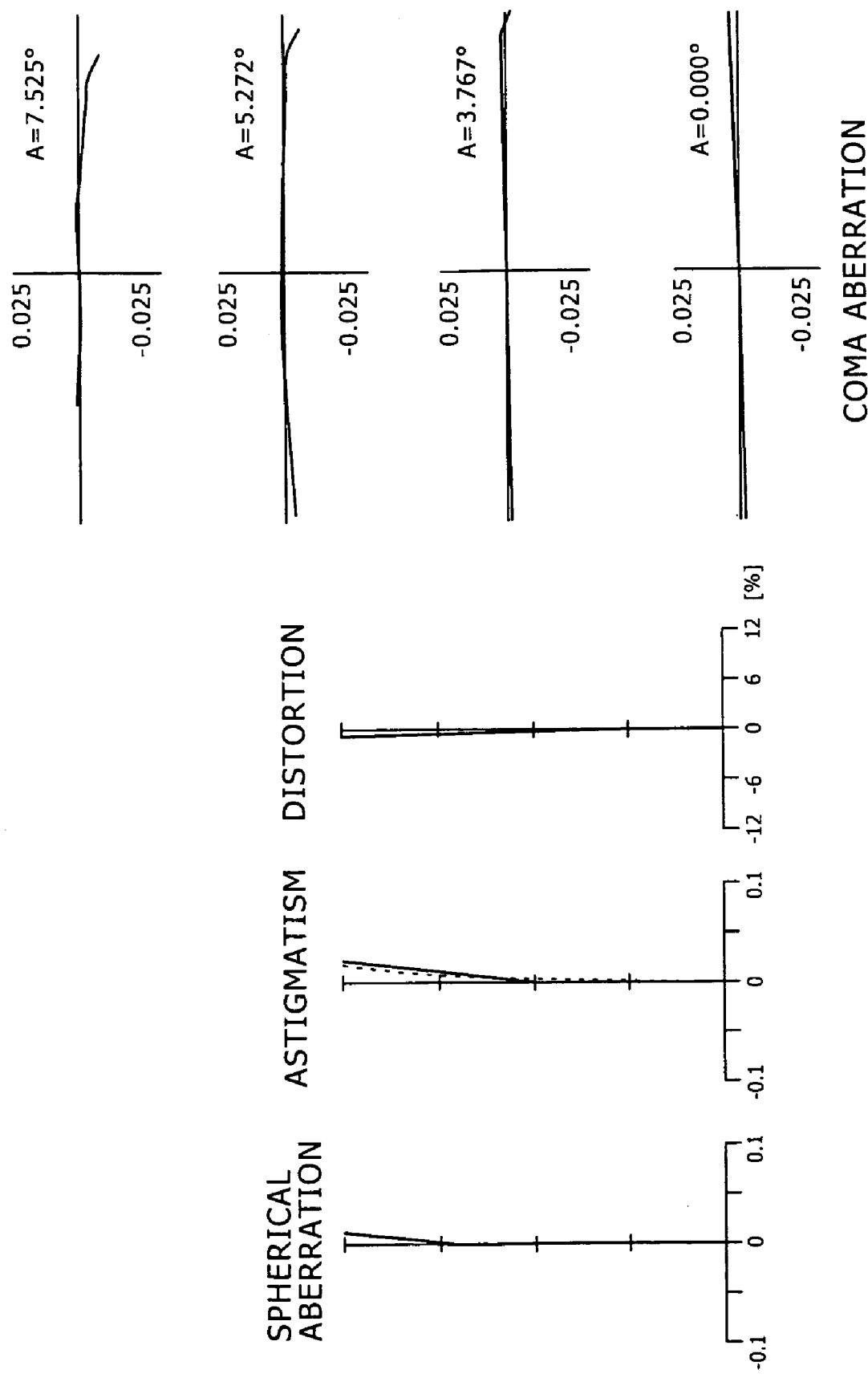
FIG. 11 shows spherical aberration, astigmatism, distortion, and coma aberration in the medium-focal-length state.
Figure 12:
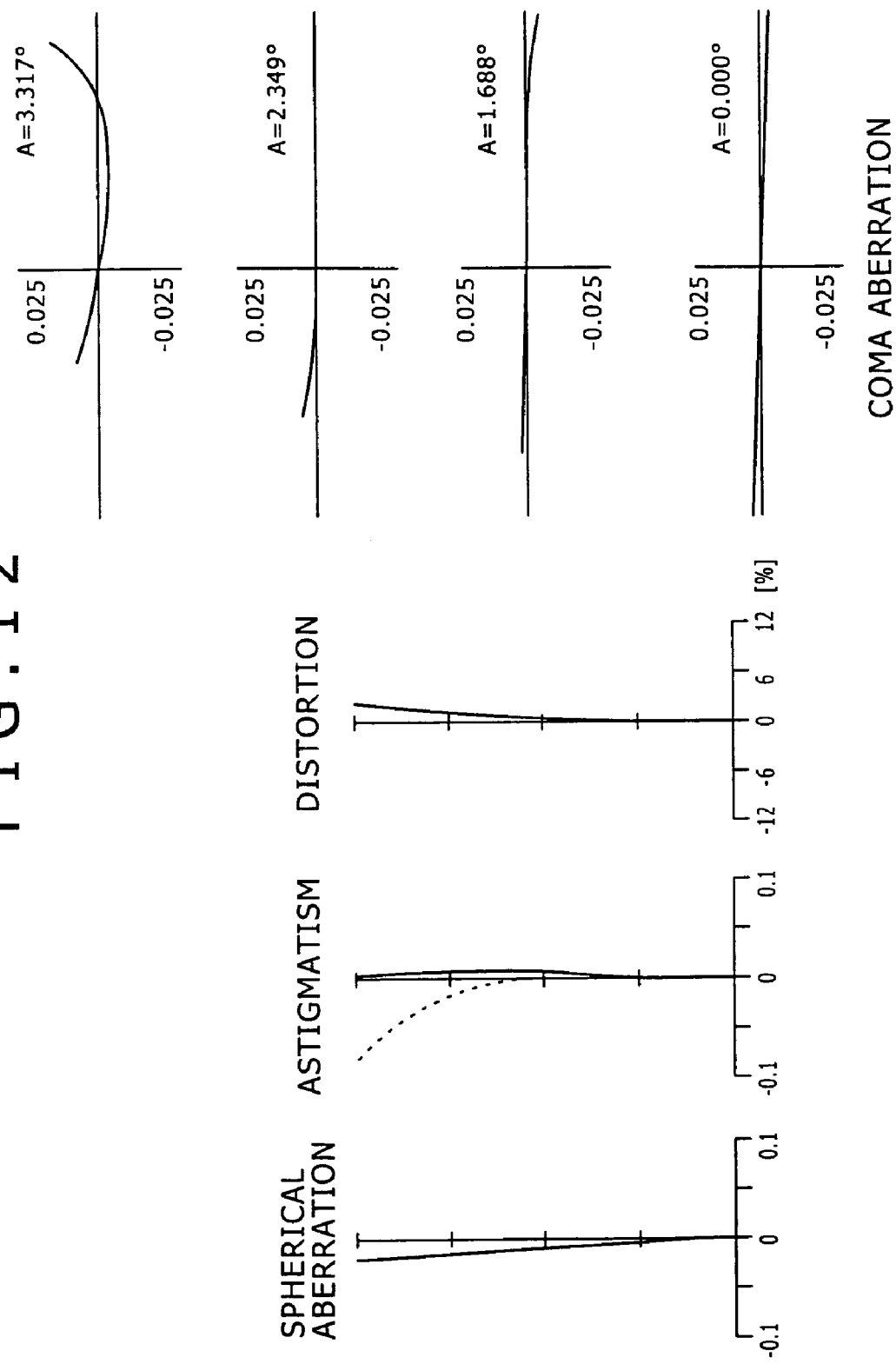
FIG. 12 shows spherical aberration, astigmatism, distortion, and coma aberration in the telephoto end state.

FIGS. 10, 11, and 12 show aberration in the infinite-distance-focusing state in the example 2 of numerical values. FIG. 10 shows aberration in the wide-angle-end state (f=5.510); FIG. 11 shows aberration in the medium-focal-length state (f=22.511); and FIG. 12 shows aberration in the telephoto end state (f=49.971).

The solid line and the broken line in the astigmatism graph of each of FIGS. 10, 11, and 12 show the astigmatism of the sagittal image and that of the meridional image, respectively. In the coma aberration graph, "A" denotes an angle of view.

Figure 13:
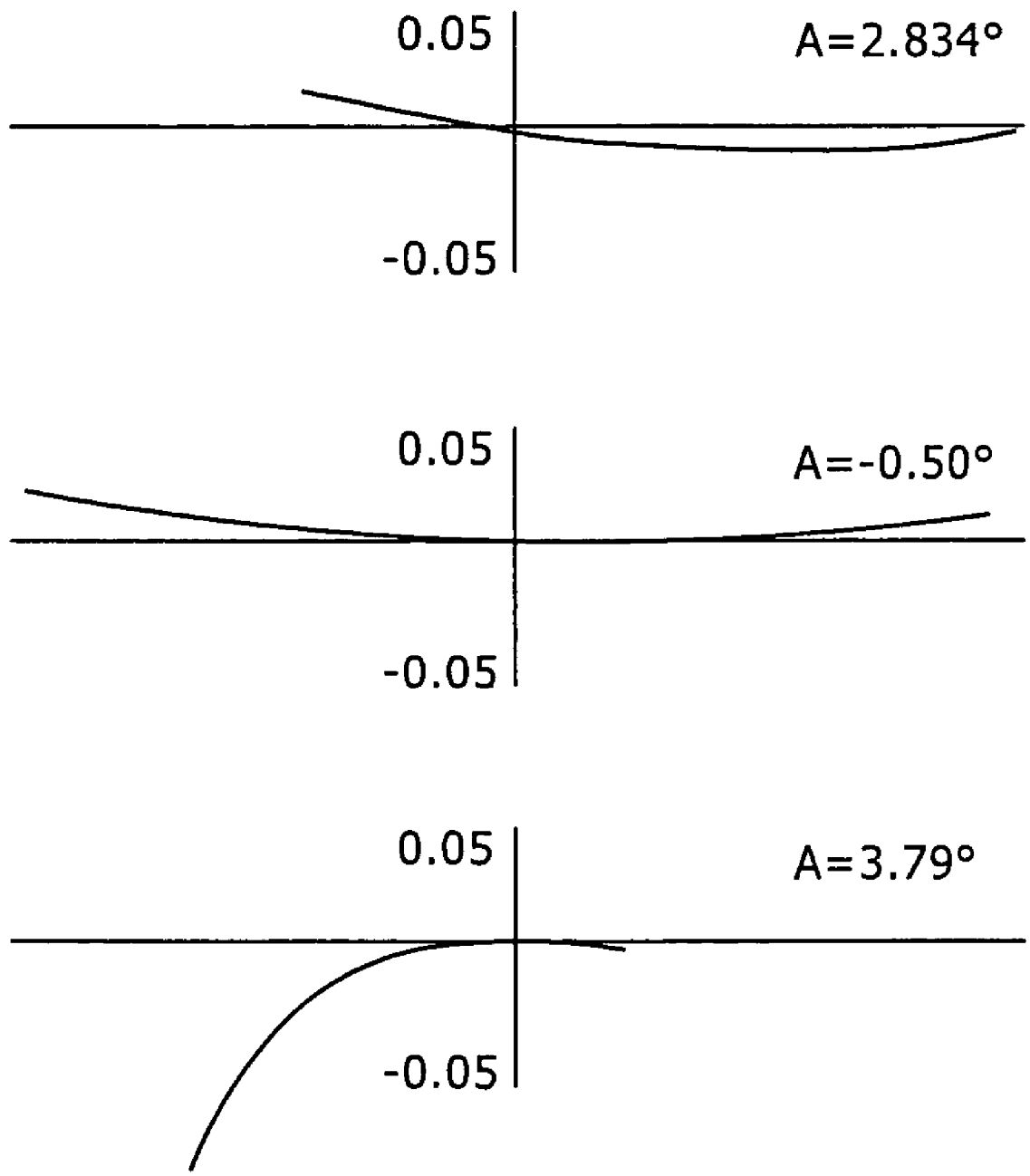
FIG. 13 shows transverse aberration in the wide-angle-end state.
Figure 14:
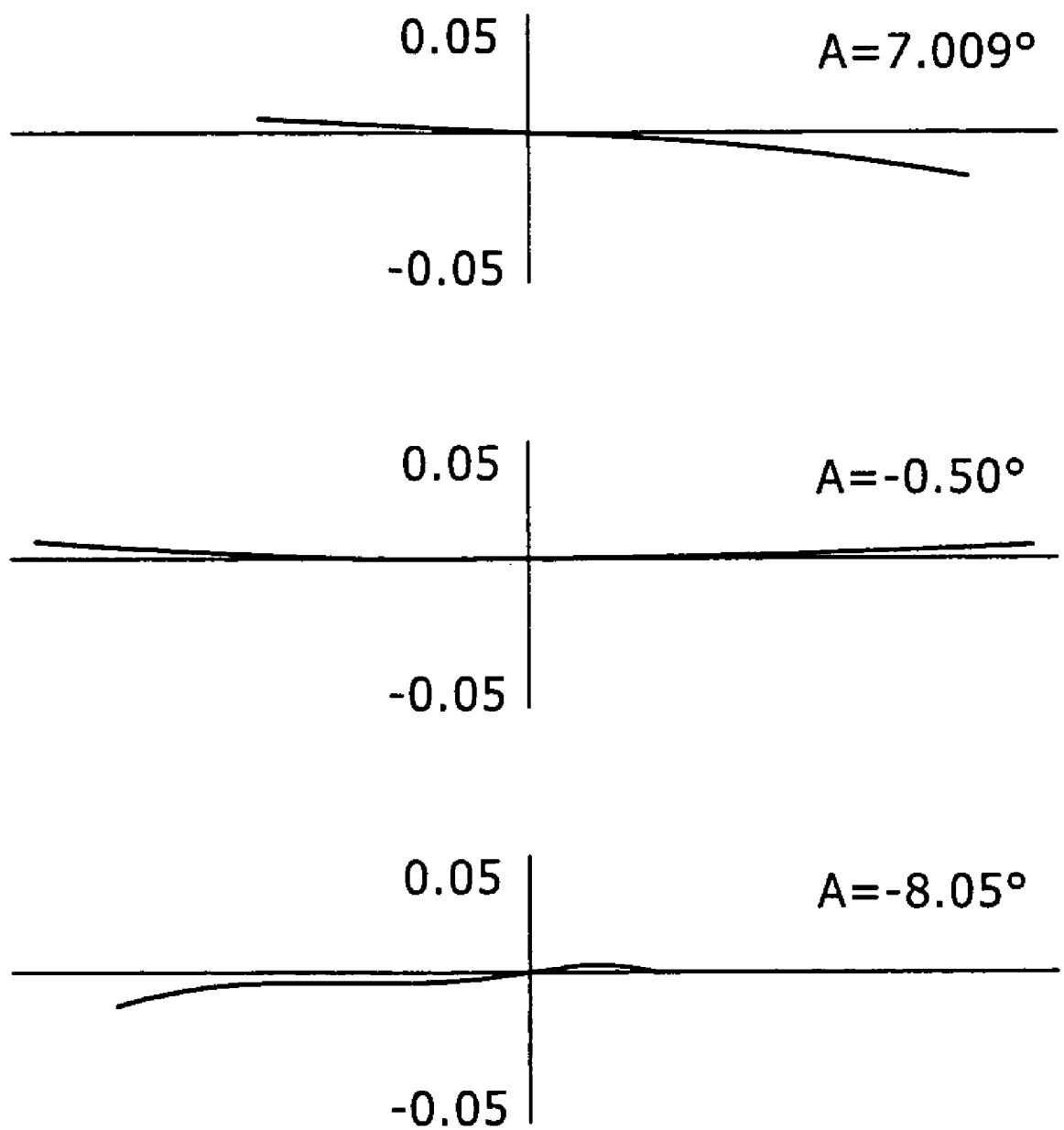
FIG. 14 shows transverse aberration in the medium-focal-length state.

FIGS. 13, 14, and 15 show transverse aberration in the infinite-distance-focusing state, with a lens shift equivalent to 0.5 degree, in the example 2 of numerical values. FIG. 13 shows transverse aberration in the wide-angle-end state (f=5.510); FIG. 14 shows transverse aberration in the medium-focal-length state (f=22.511); and FIG. 15 shows transverse aberration in the telephoto end state (f=49.971).

FIGS. 10 to 15 show that various types of aberration are sufficiently compensated for and the optical performance is high in the example 2 of numerical values.

Figure 16:
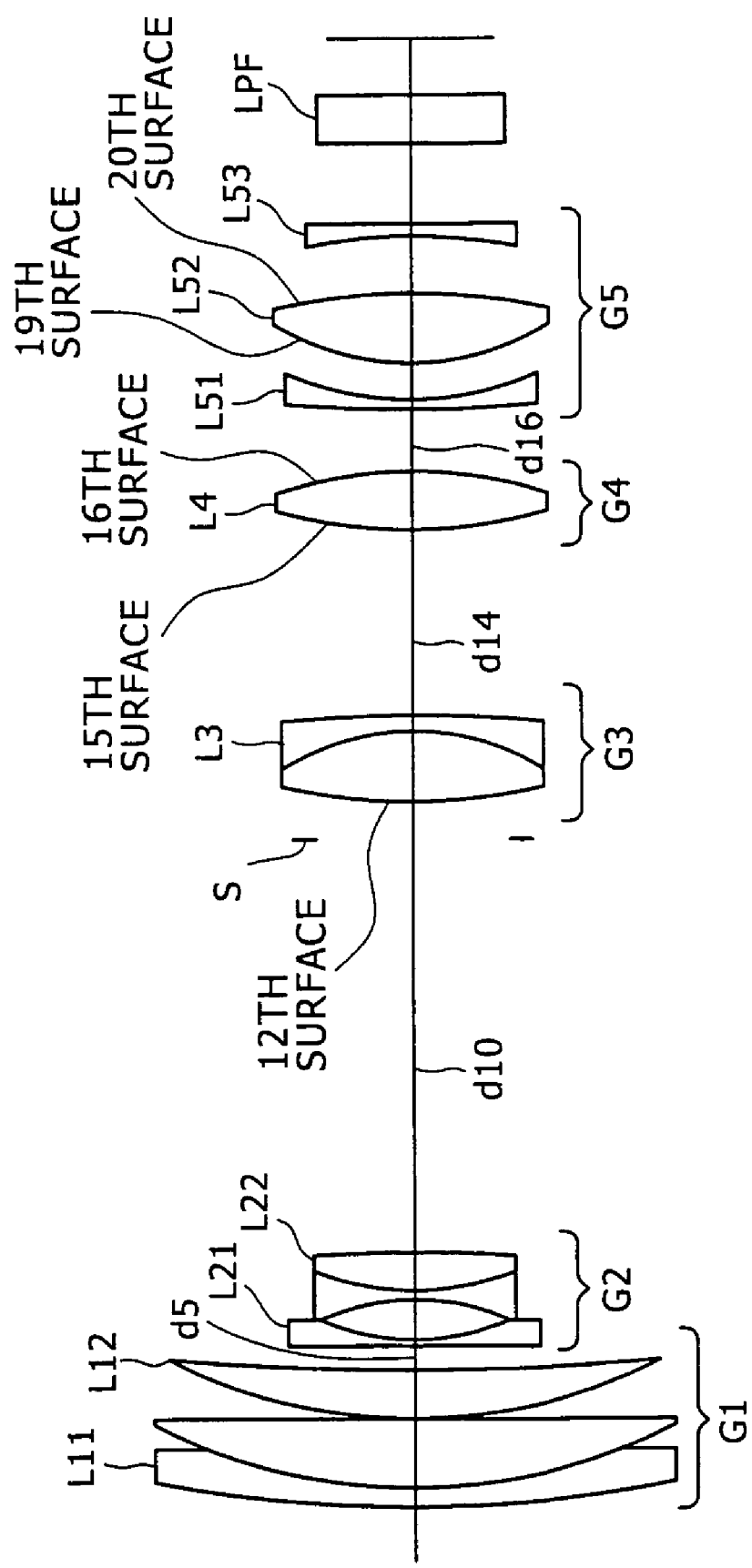
FIG. 16 shows lenses of the zoom lens of a third embodiment of the present invention.

FIG. 16 shows the lenses of the zoom lens of a third embodiment of the present invention. The first lens group G1 includes a cemented lens L11 and a positive lens L12. The cemented lens L11 includes a meniscus-shaped negative lens whose convex surface is directed toward the object side and a positive lens with a convex surface directed toward the object side. The positive lens L12 has a convex surface directed toward the object side. The second lens group G2 includes a negative lens L21 and a cemented lens L22. The negative lens L21 has a concave surface directed toward the image side. The cemented lens L22 includes a negative lens with two concave surfaces and a positive lens with one convex surface directed toward the object side. The third lens group G3 includes a cemented positive lens L3, which includes a positive lens with two convex surfaces and a negative meniscus lens. The fourth lens group G4 includes a positive lens L4 with two convex surfaces. The fifth lens group G5 includes a negative lens L51 with a concave surface directed toward the image side, a positive lens L52 with two convex surfaces, and a negative lens L53 with two concave surfaces.

In the third embodiment, an aperture stop "S" is disposed on the object side of the third lens group G3 and fixed regardless of the movement of lenses.

In the third embodiment, the negative lens L51 of the fifth lens group G5 functions as a negative subgroup, and the positive and negative lenses L52 and L53 of the fifth lens group G5 function as a positive subgroup. An image is shifted when the positive subgroup of the fifth lens group G5 is shifted in a direction perpendicular to the optical axis.

A low-pass filter "LPF" is disposed on the image side of the fifth lens group G5.

Table 9 shows an example of the numerical values of specifications of the third embodiment.

TABLE 9 f: 5.51–22.51–49.97
F No.: 1.85–2.57–2.88
2ω: 65.34–15.03–6.60°

| Surface No. | Radius of curvature | Distance between surfaces | Refractive index | Abbe number |
|---|---|---|---|---|
| 1 | 55.2831 | 0.800 | 1.92286 | 20.9 |
| 2 | 25.0792 | 2.852 | 1.75500 | 52.3 |
| 3 | 6503.5062 | 0.200 | | |
| 4 | 23.0951 | 1.911 | 1.80420 | 46.5 |
| 5 | 82.1129 | (D5) | | |
| 6 | 82.1129 | 0.400 | 1.88300 | 40.8 |
| 7 | 8.9664 | 1.755 | | |
| 8 | −9.7326 | 0.400 | 1.83500 | 43.0 |
| 9 | 11.0265 | 1.602 | 1.92286 | 20.9 |
| 10 | −58.8098 | (D10) | | |
| 11 | 0.0000 | 1.700 | (Aperture stop) | |
| 12 | 22.1061 | 3.124 | 1.74430 | 49.2 |
| 13 | −8.2140 | 0.600 | 1.80610 | 33.3 |
| 14 | −87.3704 | (D14) | | |
| 15 | 21.3761 | 2.402 | 1.48749 | 70.4 |
| 16 | −15.9699 | (D16) | | |
| 17 | 77.4936 | 0.500 | 1.83500 | 43.0 |
| 18 | 13.0720 | 1.552 | | |
| 19 | 10.3455 | 2.947 | 1.69350 | 53.4 |
| 20 | −24.5154 | 2.588 | | |
| 21 | −28.9543 | 0.500 | 1.92286 | 20.9 |
| 22 | 50.0000 | 3.255 | | |
| 23 | 0.0000 | 2.050 | 1.51680 | 64.2 |
| 24 | 0.0000 | (Bf) | | |

The 12th, 15th, 16th, 19th, and 20th lens surfaces are aspheric. The coefficients of aspheric surfaces are shown in Table 10.

TABLE 10

[12th lens Surface]

κ = −3.4095   $C_4$ = +0.95584E−06   $C_6$ = −0.24827E−07
             $C_8$ = +0.10298E−06   $C_{10}$ = −0.14780E−08

[15th lens Surface]

κ = +1.2205   $C_4$ = −0.72115E−04   $C_6$ = +0.37606E−05
             $C_8$ = −0.82193E−07   $C_{10}$ = +0.11348E−08

[16th lens Surface]

κ = +0.0000   $C_4$ = +0.56520E−04   $C_6$ = +0.14912E−05
             $C_8$ = +0.00000E+00   $C_{10}$ = +0.00000E+00

TABLE 10-continued

[19th lens Surface]

κ = −5.0000   $C_4$ = +0.51207E−03   $C_6$ = −0.96104E−05
             $C_8$ = +0.14548E−06   $C_{10}$ = −0.19913E−08

[20th lens Surface]

κ = +0.0000   $C_4$ = +0.60733E−04   $C_6$ = −0.19945E−05
             $C_8$ = +0.00000E+00   $C_{10}$ = +0.00000E+00

As the state of lens positions changes from the wide-angle-end state to the telephoto end state, the face-to-face distance $d_5$ between the first and second lens groups G1 and G2, the face-to-face distance $d_{10}$ between the second lens group G2 and the aperture stop "S", the face-to-face distance $d_{14}$ between the third and fourth lens groups G3 and G4, and the face-to-face distance $d_{16}$ between the fourth and fifth lens groups G4 and G5 change. Table 11 shows the focal length f and the face-to-face distances $d_5$, $d_{10}$, $d_{14}$, and $d_{16}$ in the wide-angle-end state, medium-focal-length state, and telephoto end state.

TABLE 11

(Table of Variable Distances)

| | | | |
|---|---|---|---|
| f | 5.510 | 22.513 | 49.970 |
| $d_5$ | 0.900 | 12.356 | 17.758 |
| $d_{10}$ | 17.658 | 6.202 | 0.800 |
| $d_{14}$ | 8.061 | 3.344 | 9.674 |
| $d_{16}$ | 2.735 | 7.452 | 1.122 |
| Bf | 2.494 | 2.494 | 2.494 |

Table 12 shows the values corresponding to the condition defined by the equations (1) to (4) in the example 3 of numerical values.

TABLE 12

$f_{5p}$ = 16.6971
$f_5$ = 349.312
(1) $f_{5p}/f_t$ = 0.334
(2) $r_p/D_f$ = 0.500
(3) $(r_p − r_n)/(r_p + r_n)$ = 0.116
(4) $f_t/f_5$ = 0.143

Figure 17:
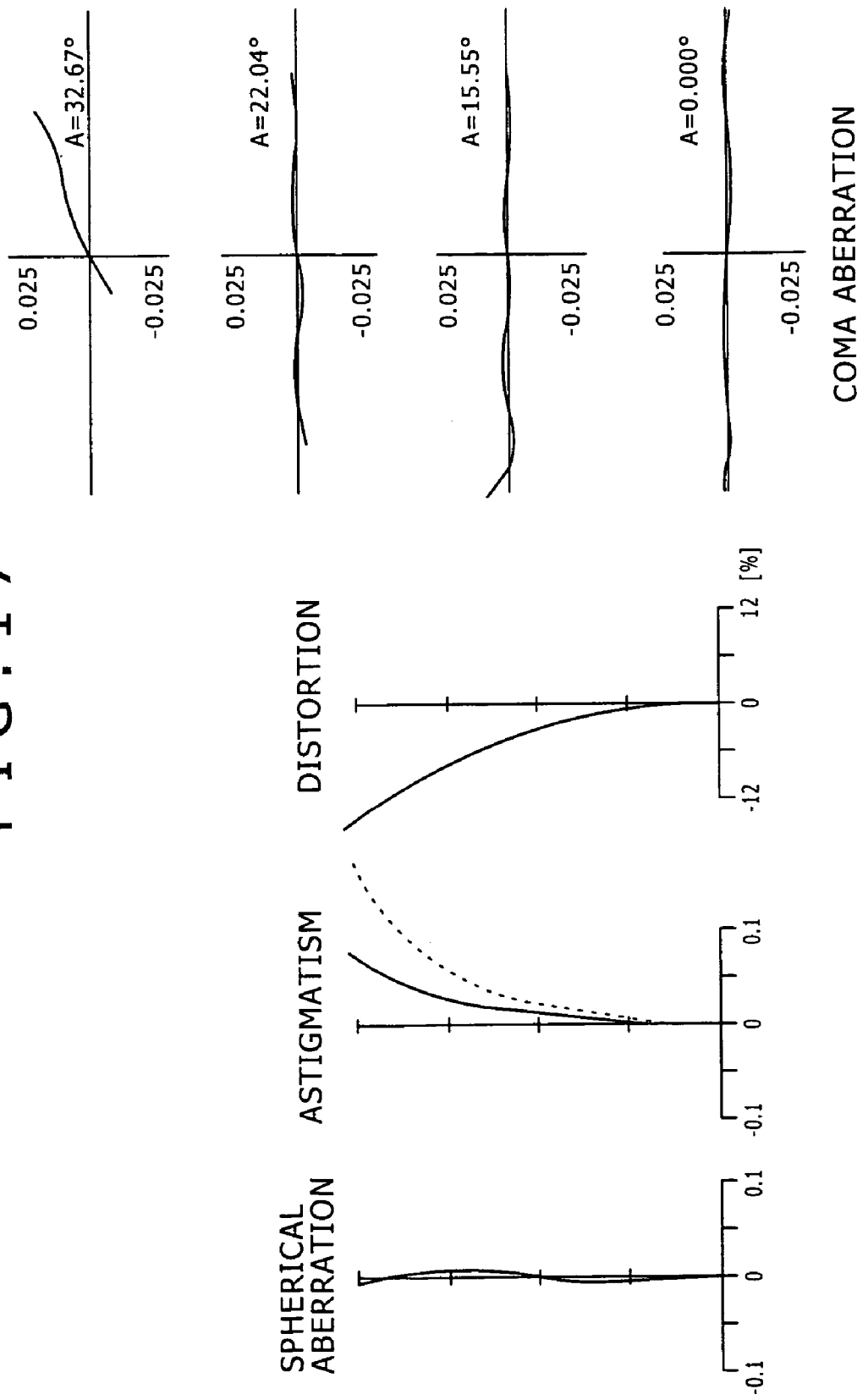
FIG. 17 shows, together with FIGS. 18 to 22, aberration in the example 3 of numerical values in which specific values are applied to the third embodiment of the zoom lens of the present invention and, in particular, it shows spherical aberration, astigmatism, distortion, and coma aberration in the wide-angle-end state.
Figure 18:
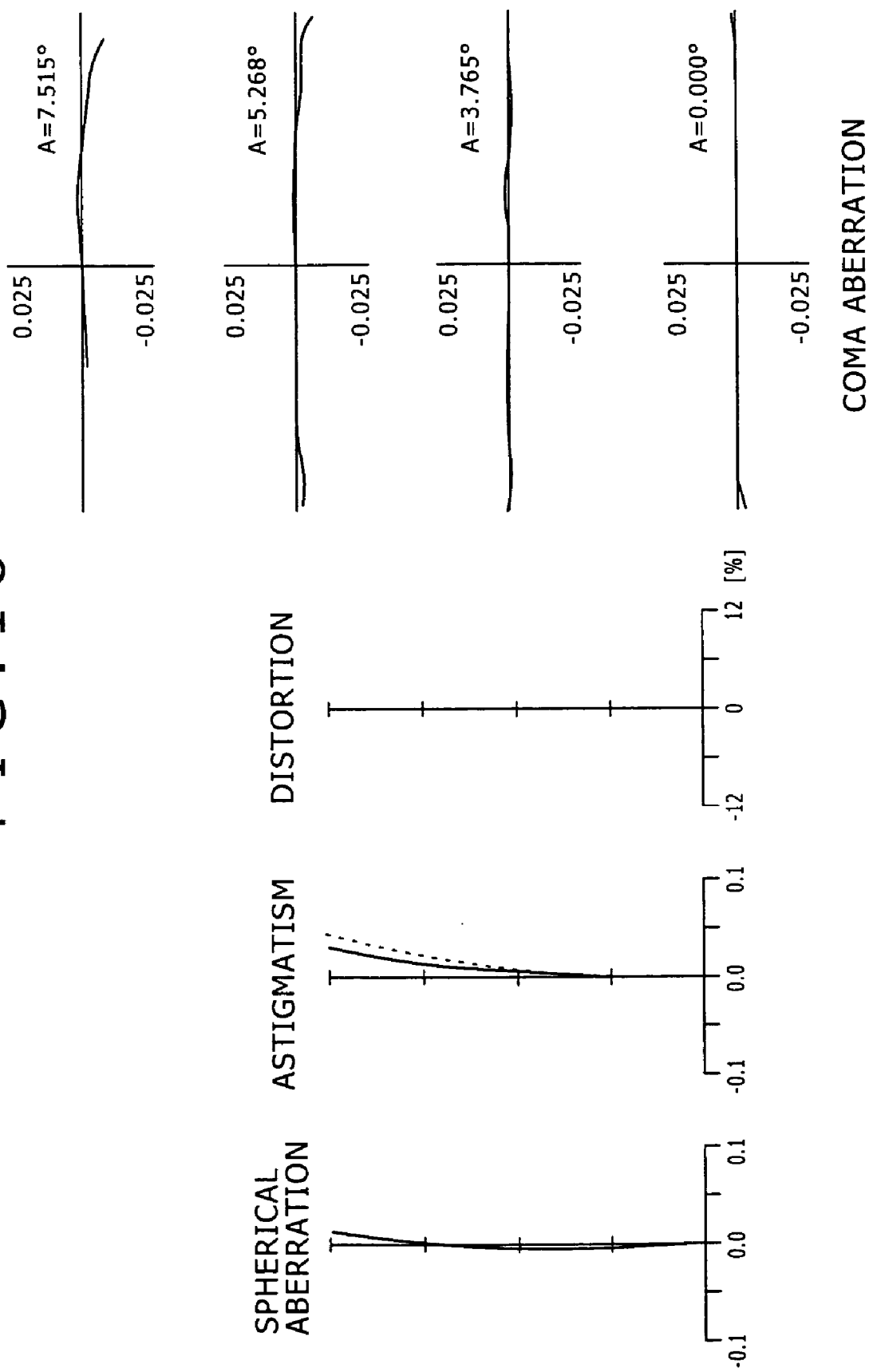
FIG. 18 shows spherical aberration, astigmatism, distortion, and coma aberration in the medium-focal length state.
Figure 19:
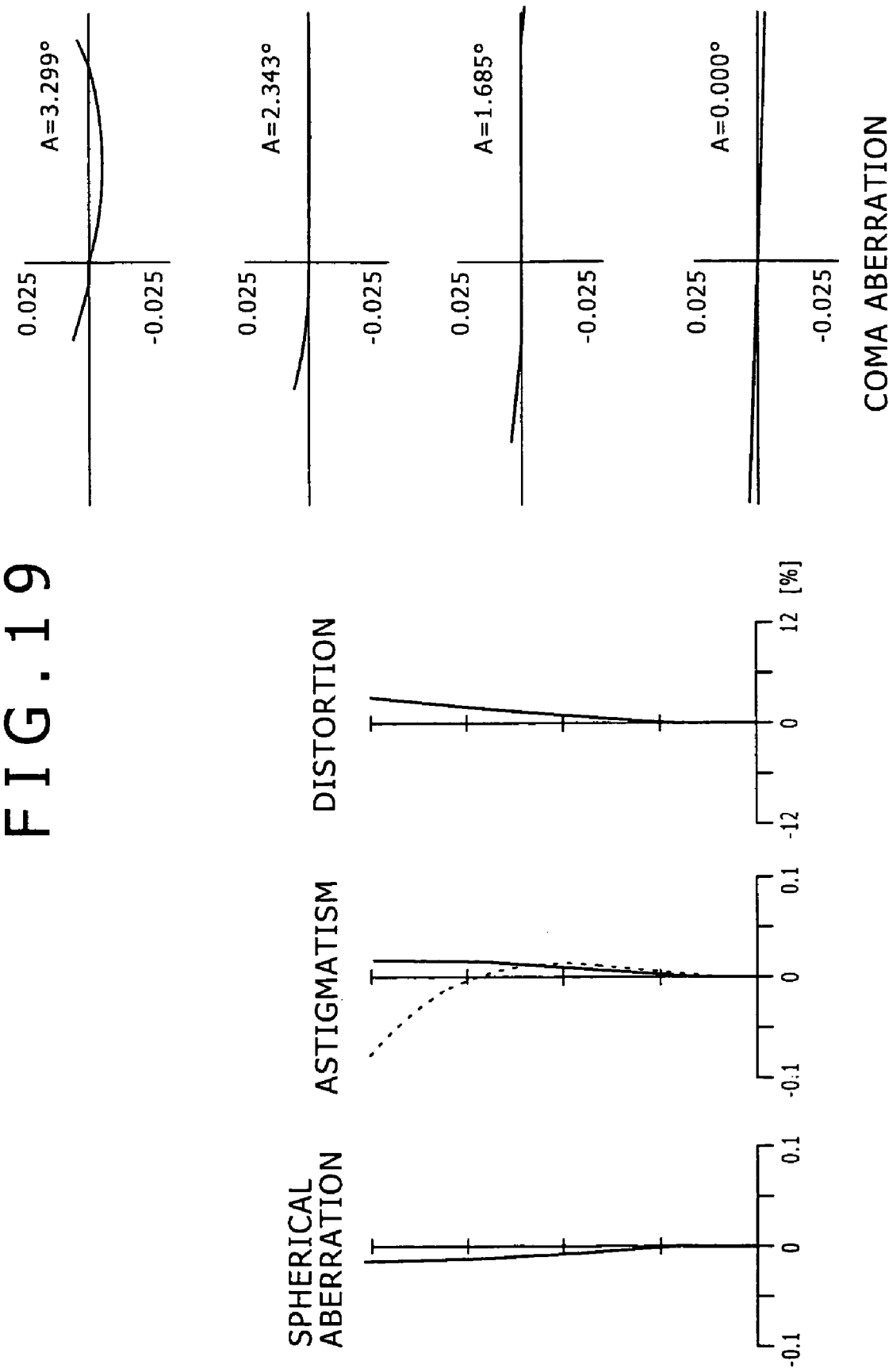
FIG. 19 shows spherical aberration, astigmatism, distortion, and coma aberration in the telephoto end state.

FIGS. 17, 18, and 19 show aberration in the infinite-distance-focusing state in the example 3 of numerical values. FIG. 17 shows aberration in the wide-angle-end state (f=5.510); FIG. 18 shows aberration in the medium-focal-length state (f=22.513); and FIG. 19 shows aberration in the telephoto end state (f=49.970).

The solid line and the broken line in the astigmatism graph of each of FIGS. 17, 18, and 19 show the astigmatism of the sagittal image and that of the meridional image, respectively. In the coma aberration graph, "A" denotes an angle of view.

FIGS. 20, 21, and 22 show transverse aberration in the infinite-distance-focusing state, with a lens shift equivalent to 0.5 degree, in the example 3 of numerical values. FIG. 20 shows transverse aberration in the wide-angle-end state (f=5.510); FIG. 21 shows transverse aberration in the medium-focal-length state (f=22.513); and FIG. 22 shows transverse aberration in the telephoto end state (f=49.970).

FIGS. 17 to 22 show that various types of aberration are sufficiently compensated for and the optical performance is high in the example 3 of numerical values.

Figure 23:
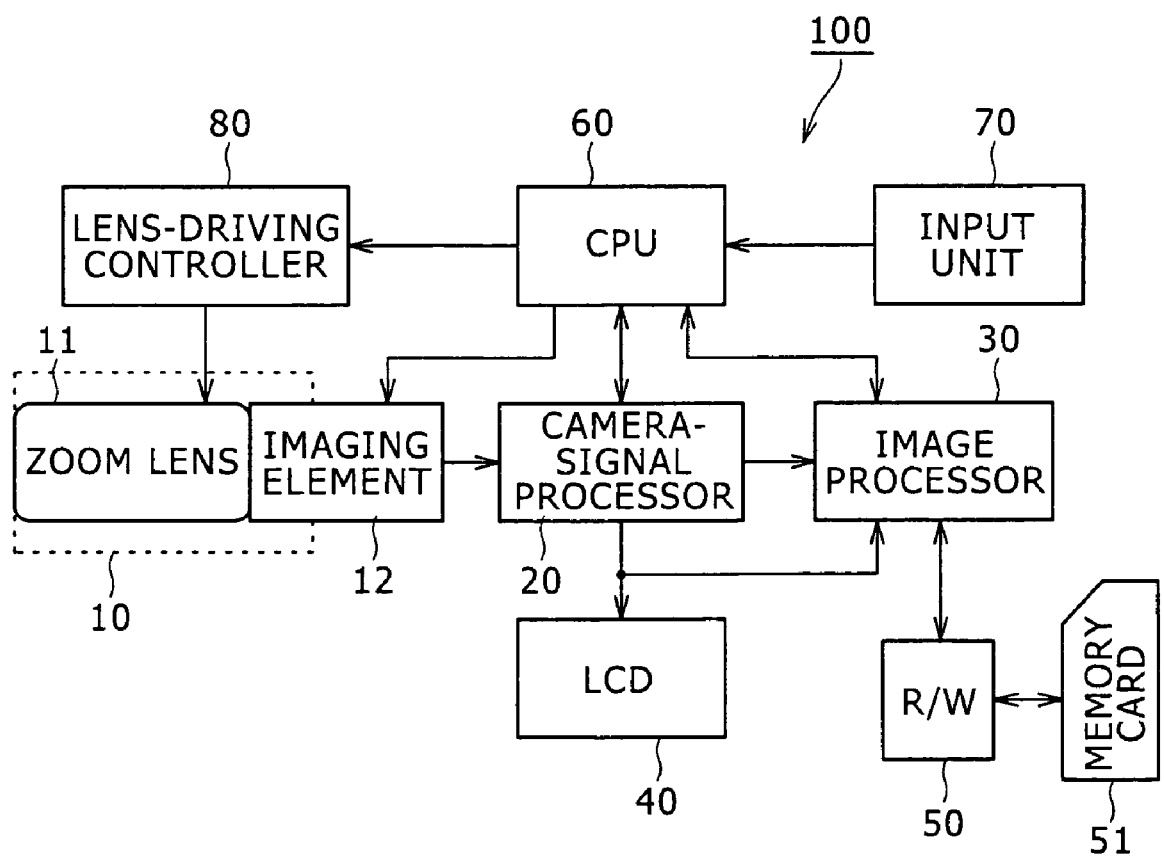
FIG. 23 is a block diagram showing an imaging device of an embodiment according to the present invention which is applied to a digital still camera.

FIG. 23 shows an embodiment of the imaging device to which the zoom lens according to an embodiment of the present invention is applied. The embodiment of FIG. 23 is the one in which the embodiment of the present invention is applied to a digital still camera.

The digital still camera 100 includes a camera block 10 having an imaging function; a camera-signal processor 20 performing signal processing such as analog-to-digital conversion of the image signals taken; an image processor 30 recording and reproducing the image signals; an LCD (Liquid Crystal Display) 40 displaying the image etc. taken; an R/W (Reader/Writer) 50 writing data to and from a memory card 51; a CPU 60 controlling the entire device; an input unit 70 through which a user inputs data; and a lens-driving controller 80 controlling the driving of the lenses in the camera block 10. Further, the lens-driving controller 80 includes a blurring-compensation mechanism having a detection system to detect the direction and amount of so-called camera shake, or unintentional movement of a camera in taking a picture; and a driving system moving (shifting) the positive subgroup of the fifth lens group G5 perpendicularly to the optical axis in a direction to cancel the blurring of the image caused by the camera shake and as much as the amount which is enough to cancel the blurring of the image based on the detection result of the above detection system.

The camera block 10 includes an optical system having a zoom lens 11 (a zoom lens according to the above embodiment or examples 1 to 3 of numerical values may be used) to which an embodiment of the present invention is applied, and an imaging element 12 etc. such as CCDs. The camera-signal processor 20 performs signal processing on output signals from the imaging element 12 such as conversion to digital signals, noise reduction, image-quality improvement, and conversion to luminance/color-difference signals. The image processor 30 performs compression/coding and decompression/decoding of the image signals, and conversion of data specification such as resolution according to a prescribed image data format.

The memory card 51 is a removable semiconductor memory. The R/W 50 writes image data coded by the image processor 30 onto the memory card 51 and reads image data from the memory card 51. The CPU 60 is a controller for controlling each circuit block in the digital still camera, and controls each circuit block based on the instruction-input signals etc. from the input unit 70.

The input unit 70 includes, for example, a shutter release button for shutter operation and a selecting switch, etc. for selecting operation modes, and outputs instruction-input signals to the CPU 60 according to the operation by a user. Based on a control signal from the CPU 60, the lens-driving controller 80 controls a motor, etc. (not shown) to drive lenses in the zoom lens 11.

Now, workings of the digital still camera will be explained briefly.

In the standby state of picture taking, controlled by the CPU 60, the image signal taken by the camera block 10 is outputted to the LCD 40 through the camera-signal processor 20 and displayed as a camera through picture. Further, when an instruction-input signal for zooming from the input unit 70 is inputted, the CPU 60 outputs a control signal to the lens-driving controller 80 and a prescribed lens in the zoom lens 11 is moved according to the control of the lens-driving controller 80.

Then, when the shutter (not shown) is released according to the instruction-input signal from the input unit 70 (at this time, the above blurring-compensation mechanism is activated and compensates for the shift of the image caused by the camera shake), taken image signals are outputted from the camera-signal processor 20 to the image processor 30, compressed and coded, and converted into digital data of a prescribed data format. The converted data are outputted to the R/W 50 and written onto the memory card 51.

Further, focusing is performed by the lens-driving controller 80 moving the prescribed lens in the zoom lens 11 according to the control signal from the CPU 60 when, for example, the release button is touched or pressed for recording.

When reproducing the image data recorded on the memory card 51, according to the operation by the input unit 70, prescribed image data are read from the memory card 51 by the R/W 50 and, after being decompressed and decoded by the image processor 30, the reproduced image signal is outputted to the LCD 40. Thus, the reproduced image is displayed.

So far, the digital still camera to which embodiments of the present invention are applied has been described. However, such application is not limited to the digital still camera, and it is needless to say that embodiments of the present invention can be applied to digital video cameras and other types of cameras.

The foregoing description is about some preferred embodiments of the disclosure of the invention and it is intended that the configurations and numerical values of all matter shown as preferred embodiments shall be interpreted as illustrative and not in a limiting sense.

According to the above embodiments of the present invention, it is possible to provide a zoom lens and an imaging device which are small as well as lightweight, high-performance and equipped with a blurring-compensation function that can be utilized widely for digital video cameras, digital still cameras, and so on.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising a first lens group with positive refractive power, a second lens group with negative refractive power, a third lens group with positive refractive power, a fourth lens group with positive refractive power, and a fifth lens group including a negative subgroup with negative refractive power and a positive subgroup with positive refractive power, the first to fifth lens groups being arranged from the object side toward the image side in the order of the above description;

wherein, when the state of lens positions changes from the state of the wide-angle end to the telephoto end state, (i) the first lens group is fixed with respect to a direction of an optical axis, (ii) the second lens group moves toward the image side, (iii) the third lens group is fixed with respect to the direction of the optical axis, (iv) the fourth lens group moves along the optical axis to compensate for the change of the position of the image surface caused by the movement of the second lens group, and (v) the fifth lens group is fixed with respect to the direction of the optical axis, the fourth lens group moving along the optical axis when the zoom lens is focused on an object at a short distance;

wherein an aperture stop is disposed in the vicinity of the third lens group;

wherein the lens surface of the negative subgroup of the fifth lens group on the image side and nearest to the image is concave, and the lens surface of the positive subgroup of the fifth lens group on the object side and nearest to the object is convex;

wherein the positive subgroup shifts in a direction approximately perpendicular to the optical axis to shift an image; and wherein the zoom lens satisfies the condition defined by the inequality (1) below:

$$0.2 < f_{5p}/f_t < 0.5$$

where $f_{5p}$ denotes the focal length of the positive subgroup of the fifth lens group, and $f_t$ denotes the focal length of the entire lens system in the telephoto end state.

2. A zoom lens as defined in claim 1, wherein the zoom lens satisfies the condition defined by the inequality (2) below:

$$0.4 < r_p/D_f < 0.8$$

where, $D_f$ denotes a distance along the optical axis from the aperture stop to the lens surface of the positive subgroup nearest to the object, and $r_p$ denotes a radius of curvature of the lens surface of the positive subgroup nearest to the object.

3. A zoom lens as defined in claim 1, wherein the zoom lens satisfies the condition defined by the inequality (3) below:

$$-0.2 < (r_p - r_n)/(r_p + r_n) < 0.2$$

where, $r_n$ denotes a radius of curvature of the lens surface of the negative subgroup nearest to the image and $r_p$ denotes a radius of curvature of the lens surface of the positive subgroup nearest to the object.

4. A zoom lens as defined in claim 2, wherein the zoom lens satisfies the condition defined by the inequality (3) below:

$$-0.2 < (r_p - r_n)/(r_p + r_n) < 0.2.$$

5. A zoom lens as defined in claim 1, wherein the zoom lens satisfies the condition defined by the inequality (4) below:

$$-0.2 < f_t/f_5 < 0.2$$

where $f_5$ denotes the focal length of the fifth lens group.

6. A zoom lens as defined in claim 2, wherein the zoom lens satisfies the condition defined by the inequality (4) below:

$$-0.2 < f_t/f_5 < 0.2$$

where, $f_5$ denotes the focal length of the fifth lens group.

7. A zoom lens as defined in claim 3, wherein the zoom lens satisfies the condition defined by the inequality (4) below:

$$-0.2 < f_t/f_5 < 0.2$$

where, $f_5$ denotes the focal length of the fifth lens group.

8. A zoom lens as defined in claim 4, wherein the zoom lens satisfies the condition defined by the inequality (4) below:

$$-0.2 < f_t/f_5 < 0.2$$

where, $f_5$ denotes the focal length of the fifth lens group.

9. A zoom lens as defined in claim 1, wherein the positive subgroup comprises a positive lens and a negative lens, the latter disposed on the image side of the former.

10. A zoom lens as defined in claim 2, wherein the positive subgroup comprises a positive lens and a negative lens, the latter disposed on the image side of the former.

11. A zoom lens as defined in claim 3, wherein the positive subgroup comprises a positive lens and a negative lens, the latter disposed on the image side of the former.

12. A zoom lens as defined in claim 4, wherein the positive subgroup comprises a positive lens and a negative lens, the latter disposed on the image side of the former.

13. A zoom lens as defined in claim 5, wherein the positive subgroup comprises a positive lens and a negative lens, the latter disposed on the image side of the former.

14. A zoom lens as defined in claim 6, wherein the positive subgroup comprises a positive lens and a negative lens, the latter disposed on the image side of the former.

15. A zoom lens as defined in claim 7, wherein the positive subgroup comprises a positive lens and a negative lens, the latter disposed on the image side of the former.

16. A zoom lens as defined in claim 8, wherein the positive subgroup comprises a positive lens and a negative lens, the latter disposed on the image side of the former.

17. An imaging device comprising a zoom lens and an imaging element to covert an optical image formed by the zoom lens into electric signals;

wherein the zoom lens comprises a first lens group with positive refractive power, a second lens group with negative refractive power, a third lens group with positive refractive power, a fourth lens group with positive refractive power, and a fifth lens group including a negative subgroup with negative refractive power and a positive subgroup with positive refractive power, the first to fifth lens groups being arranged from the object side toward the image side in the order of the above description;

wherein, when the state of lens positions changes from the state of the wide-angle end to the telephoto end state, (i) the first lens group is fixed with respect to a direction of an optical axis, (ii) the second lens group moves toward the image side, (iii) the third lens group is fixed with respect to the direction of the optical axis, (iv) the fourth lens group moves along the optical axis to compensate for the change of the position of the image surface caused by the movement of the second lens group, and (v) the fifth lens group is fixed with respect to the direction of the optical axis, the fourth lens group moving along the optical axis when the zoom lens is focused on an object at a short distance;

wherein an aperture stop is disposed in the vicinity of the third lens group;

wherein the lens surface of the negative subgroup of the fifth lens group on the image side and nearest to the image is concave, and the lens surface of the positive subgroup of the fifth lens group on the object side and nearest to the object is convex;

wherein the positive subgroup shifts in a direction approximately perpendicular to the optical axis to shift an image; and wherein the zoom lens satisfies the condition defined by the inequality (1) below:

$$0.2 < f_{5p}/f_t < 0.5$$

where, $f_{5p}$ denotes the focal length of the positive subgroup of the fifth lens group, and $f_t$ denotes the focal length of the entire lens system in the telephoto end state.

18. An imaging device as defined in claim 17, wherein the imaging device satisfies the condition defined by the inequality (2) below:

$$0.4 < r_p/D_f < 0.8$$

where, $D_f$ denotes a distance along the optical axis from the aperture diaphragm to the lens surface of the positive subgroup nearest to the object, and $r_p$ denotes a radius of curvature of the lens surface of the positive subgroup nearest to the object.

19. An imaging device as defined in claim 17, wherein the imaging device satisfies the condition defined by the inequality (3) below:

$$-0.2<(r_p-r_n)/(r_p+r_n)<0.2$$

where, $r_n$ denotes a radius of curvature of the lens surface of the negative subgroup nearest to the image and $r_p$ denotes a radius of curvature of the lens surface of the positive subgroup nearest to the object.

20. An imaging device as defined in claim 18, wherein the imaging device satisfies the condition defined by the inequality (3) below:

$$-0.2<(r_p-r_n)/(r_p+r_n)<0.2.$$

21. An imaging device as defined in claim 17, wherein the imaging device satisfies the condition defined by the inequality (4) below:

$$-0.2<f/f_5<0.2$$

where $f_5$ denotes the focal length of the fifth lens group.

22. An imaging device as defined in claim 18, wherein the imaging device satisfies the condition defined by the inequality (4) below:

$$-0.2<f/f_5<0.2$$

where $f_5$ denotes the focal length of the fifth lens group.

23. An imaging device as defined in claim 19, wherein the imaging device satisfies the condition defined by the inequality (4) below:

$$-0.2<f/f_5<0.2$$

where $f_5$ denotes the focal length of the fifth lens group.

24. An imaging device as defined in claim 20, wherein the imaging device satisfies the condition defined by the inequality (4) below:

$$-0.2<f/f_5<0.2$$

where $f_5$ denotes the focal length of the fifth lens group.

25. An imaging device as defined in claim 17, wherein the positive subgroup comprises a positive lens and a negative lens, the latter disposed on the image side of the former.

26. An imaging device as defined in claim 18, wherein the positive subgroup comprises a positive lens and a negative lens, the latter disposed on the image side of the former.

27. An imaging device as defined in claim 19, wherein the positive subgroup comprises a positive lens and a negative lens, the latter disposed on the image side of the former.

28. An imaging device as defined in claim 20, wherein the positive subgroup comprises a positive lens and a negative lens, the latter disposed on the image side of the former.

29. An imaging device as defined in claim 21, wherein the positive subgroup comprises a positive lens and a negative lens, the latter disposed on the image side of the former.

30. An imaging device as defined in claim 22, wherein the positive subgroup comprises a positive lens and a negative lens, the latter disposed on the image side of the former.

31. An imaging device as defined in claim 23, wherein the positive subgroup comprises a positive lens and a negative lens, the latter disposed on the image side of the former.

32. The imaging device as defined in claim 24, wherein the positive subgroup comprises a positive lens and a negative lens, the latter disposed on the image side of the former.

* * * * *